United States Patent
Zaharchuk et al.

(10) Patent No.: US 8,508,169 B2
(45) Date of Patent: Aug. 13, 2013

(54) METHOD OF AUTOMATICALLY CONTROLLING A MOTORIZED WINDOW TREATMENT WHILE MINIMIZING OCCUPANT DISTRACTIONS

(75) Inventors: Walter S. Zaharchuk, Macungie, PA (US); Brian Michael Courtney, Bethlehem, PA (US); William Bryce Fricke, Bethlehem, PA (US); William H. Howe, Pennsburg, PA (US); Timothy S. Majewski, New Tripoli, PA (US); Joel S. Spira, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 13/600,341

(22) Filed: Aug. 31, 2012

(65) Prior Publication Data

US 2013/0049664 A1    Feb. 28, 2013

Related U.S. Application Data

(63) Continuation of application No. 12/563,786, filed on Sep. 21, 2009, now Pat. No. 8,288,981.

(60) Provisional application No. 61/232,948, filed on Aug. 11, 2009, provisional application No. 61/100,162, filed on Sep. 25, 2008.

(51) Int. Cl.
    *G05D 3/00*    (2006.01)
(52) U.S. Cl.
    USPC ........... 318/468; 318/480; 318/280; 318/286; 160/5; 49/5; 362/265; 362/384; 362/231
(58) Field of Classification Search
    USPC .................. 160/5; 49/25; 362/265, 384, 231; 318/480, 286, 468
    See application file for complete search history.

(56) References Cited

U.S. PATENT DOCUMENTS

| | | | |
|---|---|---|---|
| 5,142,133 A * | 8/1992 | Kern et al. ................. | 250/203.4 |
| 5,237,169 A | 8/1993 | Grehant | |

(Continued)

FOREIGN PATENT DOCUMENTS

WO    WO 2007/030322 A2    3/2007

OTHER PUBLICATIONS

European Patent Office, International Search Report and Written Opinion for International Patent Application No. PCT/US2009/005312, Jun. 11, 2010, 10 pages.

(Continued)

*Primary Examiner* — Rita Leykin
(74) *Attorney, Agent, or Firm* — Mark E. Rose; Philip N. Smith; Bridget L. McDonough

(57) ABSTRACT

A load control system provides for automatically controlling a position of a motorized window treatment to control the amount of sunlight entering a space of a building through a window located in a façade of the building in order to control a sunlight penetration distance within the space and minimize occupant distractions. The load control system automatically generates a timeclock schedule having a number of timeclock events for controlling the position of the motorized window treatment during the present day. A user is able to select a desired maximum sunlight penetration distance for the space and a minimum time period that may occur between any two consecutive timeclock events. In addition, a maximum number of movements that may occur during the timeclock schedule may also be entered. The load control system uses these inputs to determine event times and corresponding positions of the motorized window treatment for each timeclock event.

28 Claims, 28 Drawing Sheets

(56) References Cited

U.S. PATENT DOCUMENTS

| | | | |
|---|---|---|---|
| 5,357,170 | A | 10/1994 | Luchaco et al. |
| 5,467,266 | A | 11/1995 | Jacobs et al. |
| 5,663,621 | A * | 9/1997 | Popat ............... 318/480 |
| 5,848,054 | A | 12/1998 | Mosebrook et al. |
| 5,905,442 | A | 5/1999 | Mosebrook et al. |
| 6,064,949 | A | 5/2000 | Werner et al. |
| 6,084,231 | A | 7/2000 | Popat |
| 6,528,957 | B1 | 3/2003 | Luchaco |
| 6,803,728 | B2 | 10/2004 | Balasubramaniam et al. |
| 6,927,547 | B2 | 8/2005 | Walko, Jr. et al. |
| 6,983,783 | B2 | 1/2006 | Carmen, Jr. et al. |
| 7,019,276 | B2 | 3/2006 | Cloutier et al. |
| 7,085,627 | B2 | 8/2006 | Bamberger et al. |
| 7,111,952 | B2 | 9/2006 | Veskovic |
| 7,310,559 | B2 | 12/2007 | Walko, Jr. |
| 7,417,397 | B2 * | 8/2008 | Berman et al. ............... 318/468 |
| 7,566,137 | B2 | 7/2009 | Veskovic |
| 7,588,067 | B2 | 9/2009 | Veskovic |
| 7,737,653 | B2 | 6/2010 | Carmen et al. |
| 7,839,109 | B2 | 11/2010 | Carmen et al. |
| 7,950,827 | B2 | 5/2011 | Veskovic |
| 7,963,675 | B2 | 6/2011 | Veskovic |
| 7,977,904 | B2 * | 7/2011 | Berman et al. ............... 318/480 |
| 2005/0110416 | A1 | 5/2005 | Veskovic |
| 2006/0207730 | A1 | 9/2006 | Berman et al. |
| 2007/0211446 | A1 | 9/2007 | Veskovic |
| 2007/0211447 | A1 | 9/2007 | Veskovic |
| 2008/0092075 | A1 | 4/2008 | Jacob et al. |
| 2008/0236763 | A1 | 10/2008 | Kates |
| 2008/0283621 | A1 | 11/2008 | Quirno et al. |
| 2009/0020233 | A1 | 1/2009 | Berman et al. |
| 2009/0065598 | A1 | 3/2009 | Quirno et al. |
| 2009/0222137 | A1 | 9/2009 | Berman et al. |
| 2009/0240381 | A1 | 9/2009 | Lane |
| 2009/0254222 | A1 | 10/2009 | Berman et al. |

OTHER PUBLICATIONS

E.S. Lee et al, Integrated Performance of an Automated Venetian Blind/Electric Lighting System in a Full-Scale Private Office, Sep. 1998, 26 pages, University of California, Berkeley, California.

E.S. Lee et al, Low-Cost Networking for Dynamic Window Systems, Energy and Buildings 36, 2004, 13 pages, Lawrence Berkeley National Laboratory, Berkeley, California.

* cited by examiner

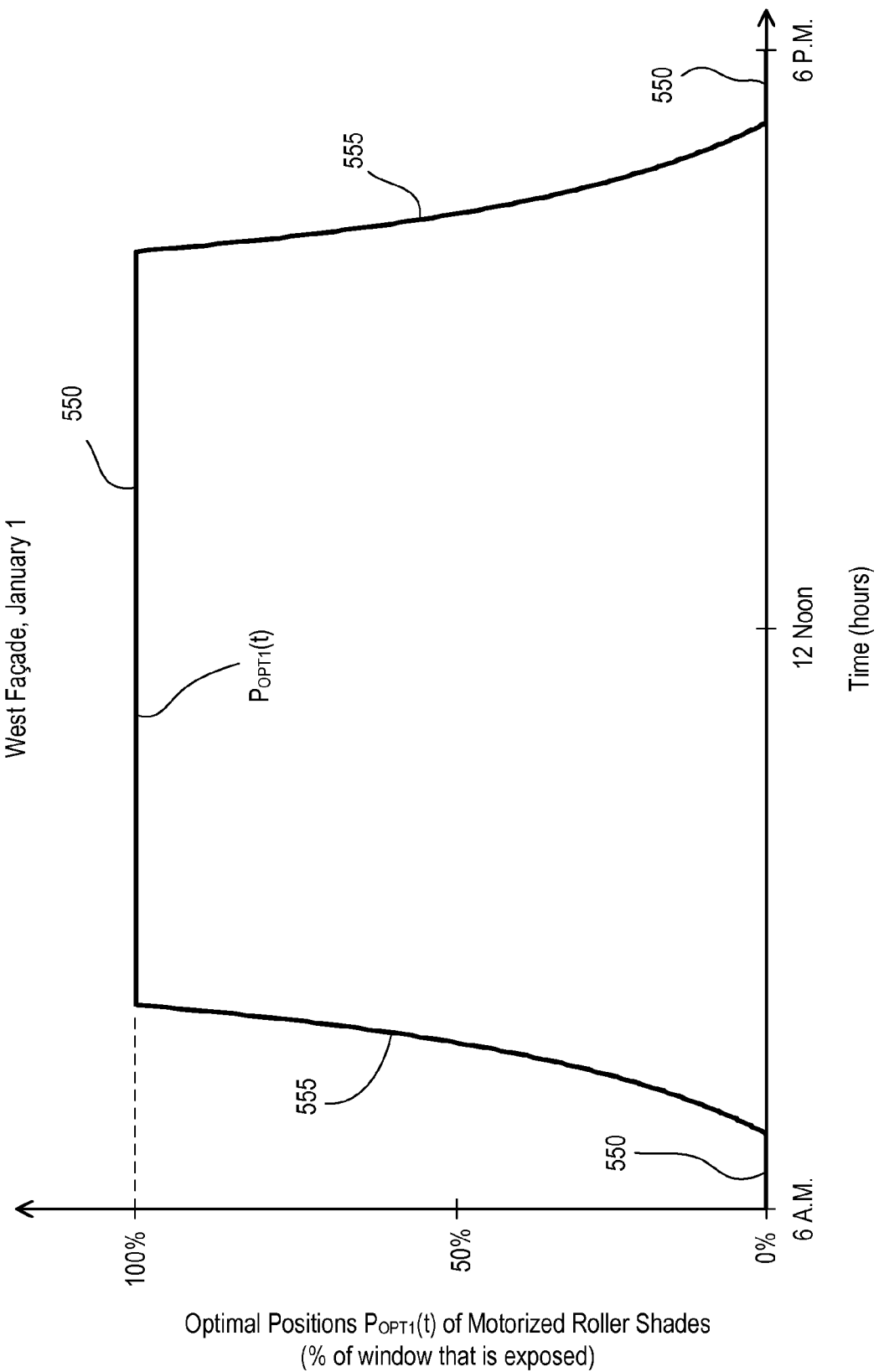

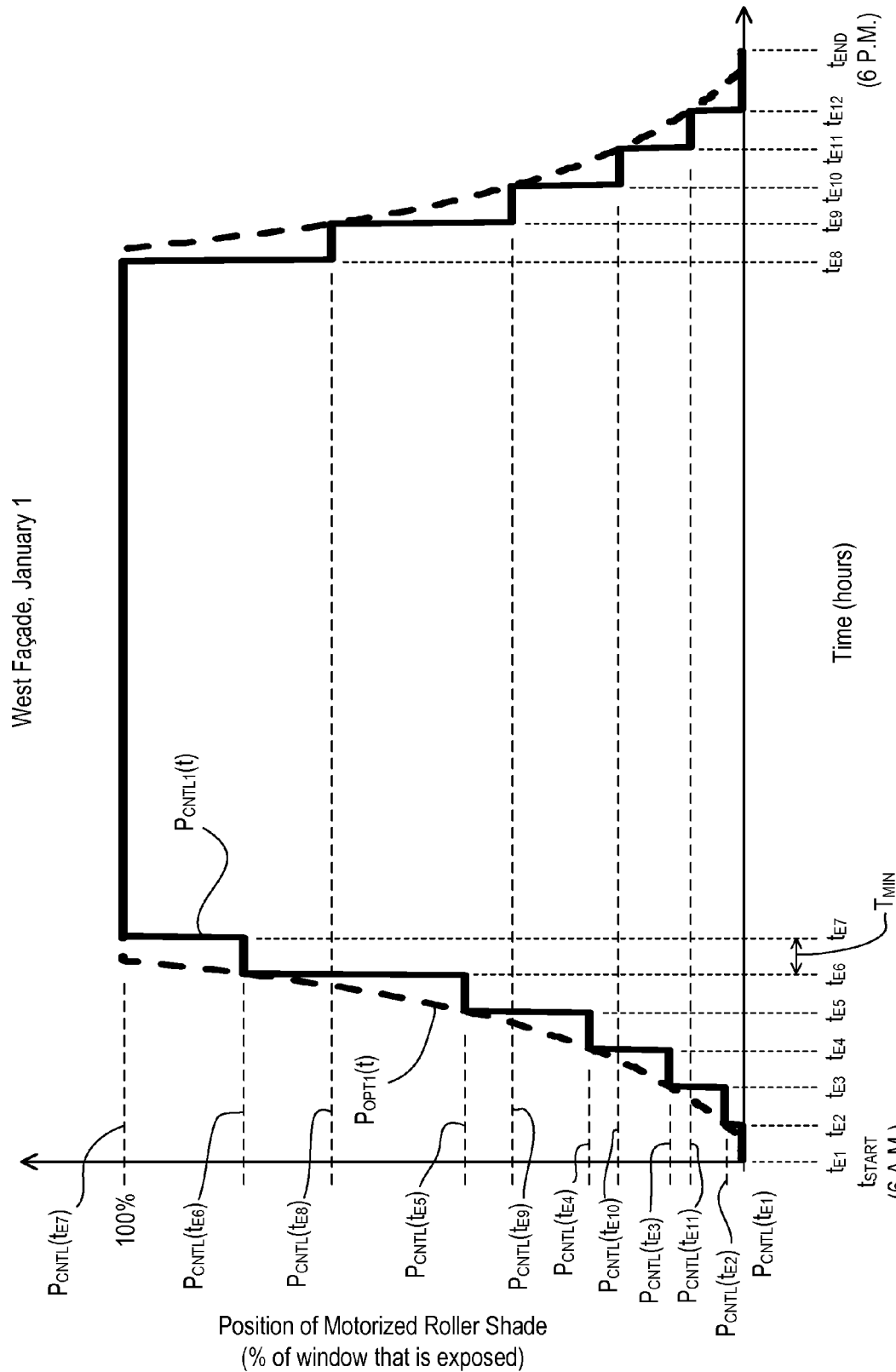

METHOD OF AUTOMATICALLY CONTROLLING A MOTORIZED WINDOW TREATMENT WHILE MINIMIZING OCCUPANT DISTRACTIONS

CROSS REFERENCE TO RELATED APPLICATIONS

This application is a continuation application of U.S. patent application Ser. No. 12/563,786, filed Sep. 21, 2009, now U.S. Pat. No. 8,288,981, issued Oct. 16, 2012, which claims priority from commonly-assigned U.S. Provisional Patent Application No. 61/100,162, filed Sep. 25, 2008, and U.S. Provisional Patent Application No. 61/232,948, filed Aug. 11, 2009, all entitled METHOD OF AUTOMATICALLY CONTROLLING A MOTORIZED WINDOW TREATMENT WHILE MINIMIZING OCCUPANT DISTRACTIONS, the entire disclosures of which are hereby incorporated by reference.

BACKGROUND OF THE INVENTION

1. Field of the Invention

The present invention relates to a load control system for controlling a plurality of electrical loads and a plurality of motorized window treatments in a space, and more particularly, to a procedure for automatically controlling one or more motorized window treatments to prevent direct sun glare on work spaces in the space while minimizing occupant distractions.

2. Description of the Related Art

Motorized window treatments, such as, for example, motorized roller shades and draperies, provide for control of the amount of sunlight entering a space. Some prior art motorized window treatments have been automatically controlled in response to various inputs, such as daylight sensors and timeclocks. However, the automatic control algorithms of prior art motorized window treatments have resulted in frequent movement of the motorized window treatments, thus causing many distractions to occupants of the space. Thus, there exists a need for a simple method of automatically controlling one or more motorized window treatments while minimizing occupant distractions.

SUMMARY OF THE INVENTION

According to an embodiment of the present invention, a method of automatically controlling a position of a motorized window treatment to control the amount of sunlight entering a space of a building through a window located in a façade of the building allows for control of a sunlight penetration distance within the space, while minimizing occupant distractions. The method comprises the steps of: (1) building a timeclock schedule having a start time and an end time, the timeclock schedule including at least first and second consecutive timeclock events having respective first and second event times spaced apart by at least a desired minimum time period that may occur between any two consecutive timeclock events; (2) calculating optimal positions of the motorized window treatment at a plurality of different times between the start time and the end time that will ensure that the sunlight penetration distance will not exceed a desired maximum sunlight penetration distance at the plurality of different times between the start time and the end time; (3) using the optimal positions to determine, for the first timeclock event, a first event position to which the motorized window treatment will be controlled at the first event time, such that the sunlight penetration distance will not exceed the desired maximum sunlight penetration distance between the first and second event times; (4) using the optimal positions to determine, for the second timeclock event, a second event position to which the motorized window treatment will be controlled at the second event time; and (5) automatically controlling the motorized window treatment according to the timeclock schedule by adjusting the position of the motorized window treatment to the first and second event positions at the first and second event times, respectively. The first and second event positions are the same position if the first and second timeclock events are located within a flat region of the optimal positions during which the optimal positions do not change in value for at least the minimum time period.

According to another embodiment of the present invention, a method of automatically controlling a position of a motorized window treatment while minimizing occupant distractions comprises the steps of: (1) receiving a desired maximum sunlight penetration distance for a space and a desired minimum time period that may occur between any two consecutive timeclock events; (2) building a timeclock schedule having a start time and an end time, the timeclock schedule including a number of timeclock events having respective event times spaced apart such that at least the minimum time period exists between the event times of any two consecutive timeclock events; (3) calculating optimal positions of the motorized window treatment at a plurality of different times between the start time and the end time that ensure that a sunlight penetration distance will not exceed the desired maximum sunlight penetration distance at the plurality of different times between the start time and the end time; (4) using the optimal positions to determine for each of the timeclock events a respective event position to which the motorized window treatment will be controlled at the respective event time, such that the sunlight penetration distance will not exceed the desired maximum sunlight penetration distance for all of the events between the start time and the end time; and (5) automatically controlling the motorized window treatment according to the timeclock schedule by adjusting the position of the motorized window treatment to the respective position of each of the timeclock events at the respective event time. If the optimal positions of the motorized window treatment are characterized by a flat region during which the optimal positions do not change in value for at least the minimum time period that may occur between any two consecutive timeclock events, the position of the motorized window treatment is controlled to a constant position for an amount of time greater than the minimum time period that may occur between any two consecutive timeclock events.

In addition, a load control system comprising a motorized window treatment adapted to control the amount of sunlight entering a space of a building through a window located in a façade of the building is also described herein. The load control system comprises a central controller operatively coupled to the motorized window treatment and operable to transmit digital commands to the motorized window treatment. The controller builds a timeclock schedule having a start time and an end time, where the timeclock schedule includes at least first and second consecutive timeclock events having respective first and second event times spaced apart by at least a desired minimum time period that may occur between any two consecutive timeclock events. The controller calculates optimal positions of the motorized window treatment at a plurality of different times between the start time and the end time to ensure that the sunlight penetration distance will not exceed a desired maximum sunlight penetration distance at the plurality of different times between the start time and the end time. The controller uses the optimal positions to determine, for the first timeclock event, a first event position to which the motorized window treatment will be controlled at the first event time, such that the sunlight penetration distance will not exceed the desired maximum sunlight penetration distance between the first and second event times. The controller automatically adjusts the position of the motorized window treatment according to the timeclock schedule by adjusting the position of the motorized window treatment to the first and second event positions at the first and second event times, respectively. If the first and second timeclock events are located within a flat region of the optimal positions during which the optimal positions do not change in value for at least the minimum time period, the central controller maintains the position of the motorized window treatment at the first event position at the second event time.

Other features and advantages of the present invention will become apparent from the following description of the invention that refers to the accompanying drawings.

BRIEF DESCRIPTION OF THE DRAWINGS

The invention will now be described in greater detail in the following detailed description with reference to the drawings in which:

FIGS. 9A-9C show example plots of optimal shade positions of the motorized roller shades of the load control system of FIG. 1 on different facades of the building during different days of the year according to the second embodiment of the present invention;

FIGS. 11A-11C show example plots of controlled shade positions of the motorized roller shades of the load control system of FIG. 1 on different facades of the building during different days of the year according to the second embodiment of the present invention;

DETAILED DESCRIPTION OF THE INVENTION

Figure 1:
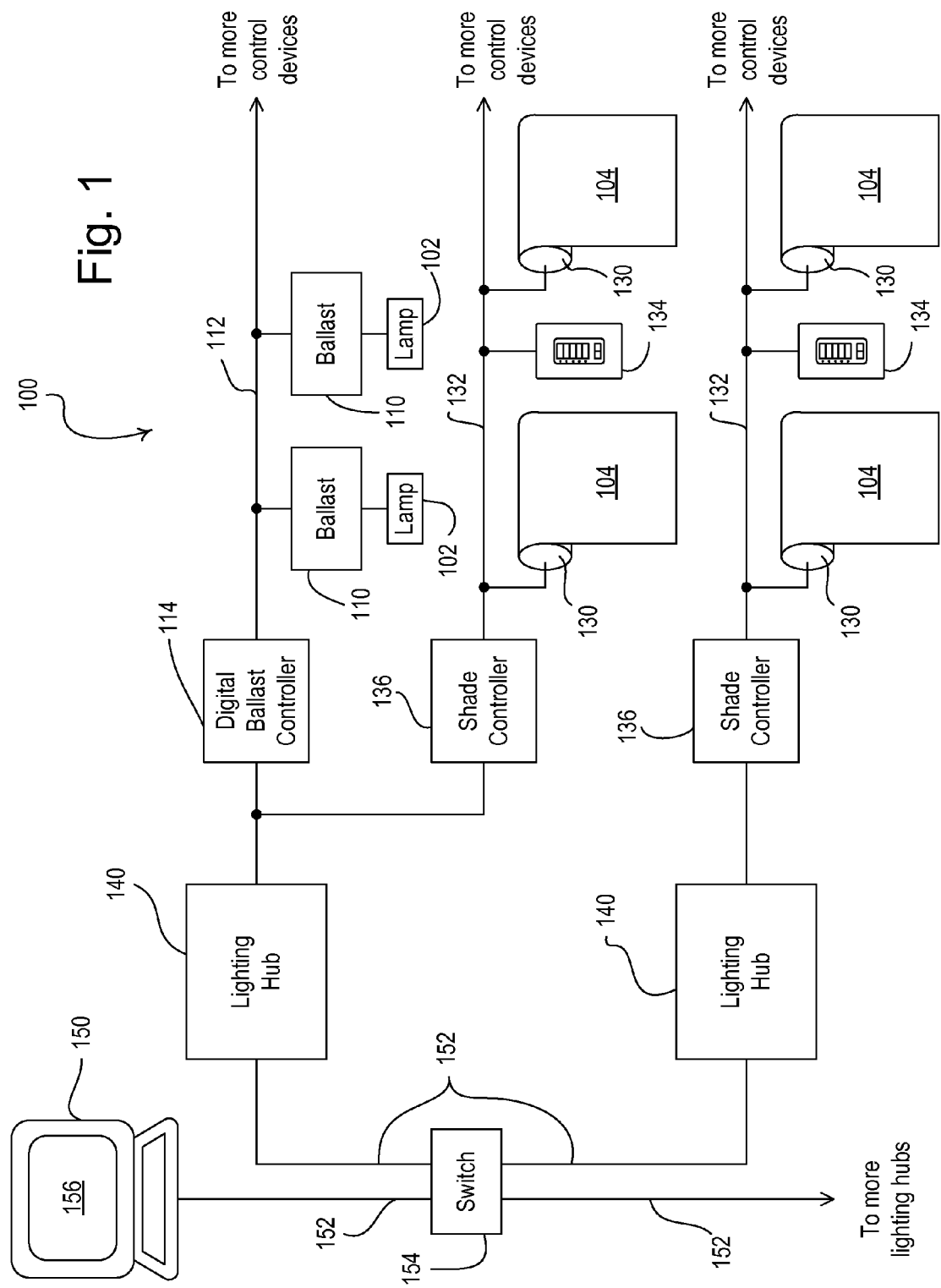
FIG. 1 is a simplified block diagram of a load control system having both load control devices and motorized roller shades.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a load control system 100 according to the present invention. The load control system 100 is operable to control the level of illumination in a space by controlling the intensity level of the electrical lights in the space and the daylight entering the space. As shown in FIG. 1, the load control system 100 is operable to control the amount of power delivered to (and thus the intensity of) a plurality of lighting loads, e.g., a plurality of fluorescent lamps 102. The load control system 100 is further operable to control the position of a plurality of motorized window treatments, e.g., motorized roller shades 104, to control the amount of sunlight entering the space. The motorized window treatments could alternatively comprise motorized draperies, blinds, or roman shades.

Each of the fluorescent lamps 102 is coupled to one of a plurality of digital electronic dimming ballasts 110 for control of the intensities of the lamps. The ballasts 110 are operable to communicate with each other via digital ballast communication links 112. For example, the digital ballast communication link 112 may comprise a digital addressable lighting interface (DALI) communication link. Each digital ballast communication link 112 is also coupled to a digital ballast controller (DBC) 114, which provides the necessary direct-current (DC) voltage to power the communication link 112 and assists in the programming of the load control system 100. The ballasts 110 are operable to transmit digital messages to the other ballasts 110 via the digital ballast communication link 112.

Each of the motorized roller shades 104 comprises an electronic drive unit (EDU) 130. For example, each electronic drive unit 130 may be located inside a roller tube of the associated roller shade 104. The electronic drive units 130 are responsive to digital messages received from a wallstation 134 via a shade communication link 132. The user is operable to use the wallstation 134 to open or close the motorized roller shades 104, adjust the position of a shade fabric 170 (FIG. 2) of the roller shades, or set the roller shades to preset shade positions between an open-limit position (e.g., a fully-open position $P_{FO}$) and a closed-limit position (e.g., a fully-closed position $P_{FC}$). The user is also operable to configure the operation of the motorized roller shades 104 using the wallstations 134. A shade controller (SC) 136 is coupled to the shade communication link 132. An example of a motorized window treatment control system is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference.

A plurality of lighting hubs 140 act as central controllers for managing the operation of the load control devices (i.e., the ballasts 110 and the electronic drive units 130) of the load control system 100. Each lighting hub 140 is operable to be coupled to at least one of the digital ballast controllers 114 to allow the lighting hub to communicate with the ballasts 110 on one of the digital ballast communication links 112. Each lighting hub 140 is further operable to be coupled to the shade controller 136 to allow the lighting hub to communicate with the electronic drive units 130 of the motorized roller shades 104 on one of the shade communication links 132. The lighting hubs 140 are further coupled to a personal computer (PC) 150 via an Ethernet link 152 and a standard Ethernet switch 154, such that the PC is operable to transmit digital messages to the ballasts 110 and the electronic drive units 130 via the lighting hubs 140. The PC 150 executes a graphical user interface (GUI) software, which is displayed on a PC screen 156. The GUI software allows the user to configure and monitor the operation of the load control system 100. During configuration of the lighting control system 100, the user is operable to determine how many ballasts 110, digital ballast controllers 114, electronic drive units 130, shade controllers 136, and lighting hubs 140 that are connected and active using the GUI software. Further, the user may also assign one or more of the ballasts 110 to a zone or a group, such that the ballasts 110 in the group respond together to, for example, an actuation of a wallstation.

According to the embodiments of the present invention, the lighting hubs 140 are operable to transmit digital messages to the motorized roller shades 104 to control the amount of sunlight entering a space 160 of a building 162 (FIG. 4) to control a sunlight penetration distance $d_{PEN}$ in the space. Each lighting hub 140 comprises an astronomical timeclock and is able to determine a sunrise time $t_{SUNRISE}$ and a sunset time $t_{SUNSET}$ for each day of the year for a specific location. The lighting hubs 140 each transmit commands to the electronic drive units 130 to automatically control the motorized roller shades 104 in response to a timeclock schedule. Alternatively, the PC 150 could comprise the astronomical timeclock and could transmit the digital messages to the motorized roller shades 104 to control the sunlight penetration distance $d_{PEN}$ in the space 160.

Figure 2:
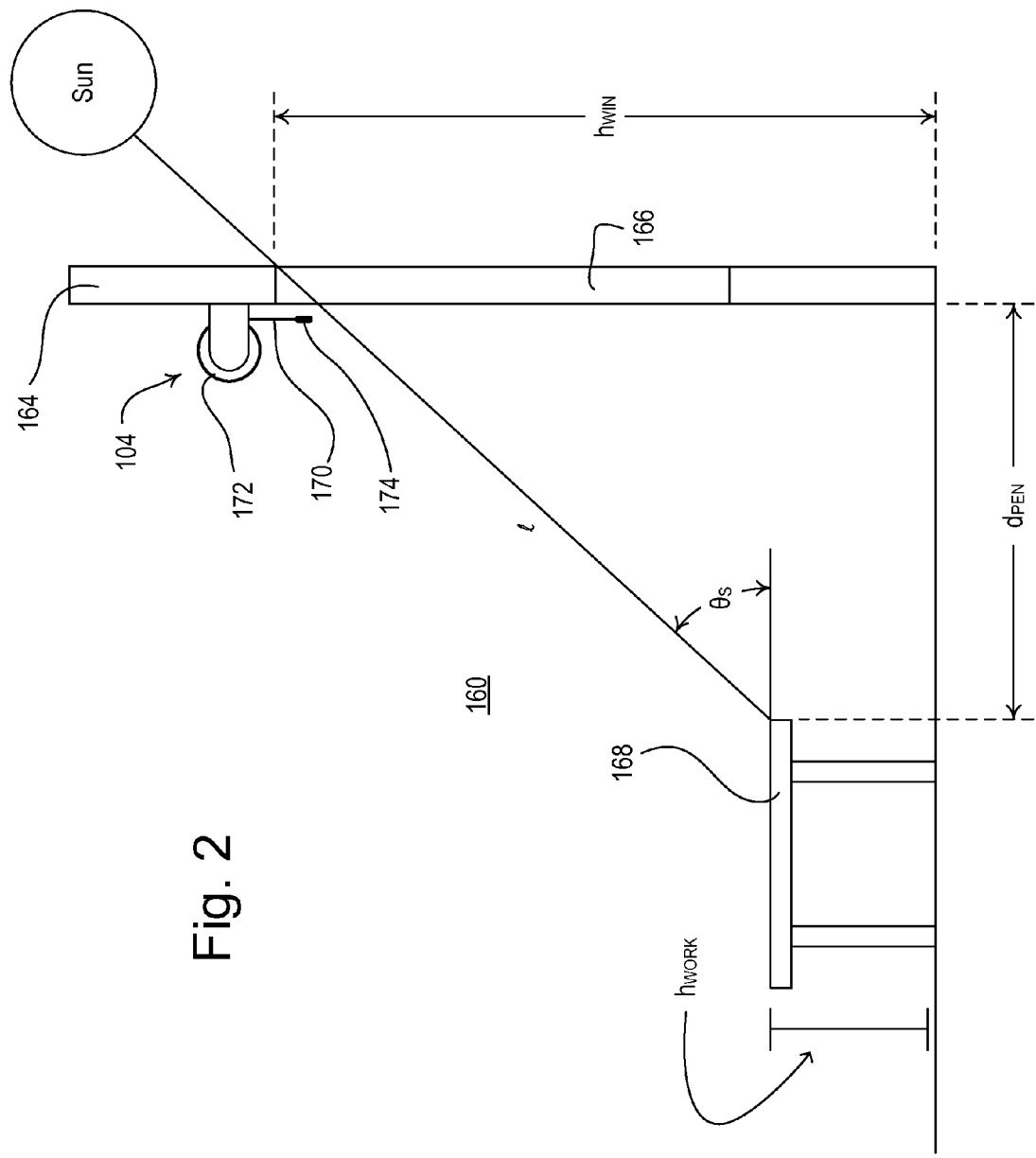
FIG. 2 is a simplified side view of an example of a space of a building having a window covered by one of the motorized roller shades of the load control system of FIG. 1.

FIG. 2 is a simplified side view of an example of the space 160 illustrating the sunlight penetration distance $d_{PEN}$, which is controlled by the motorized roller shades 104. As shown in FIG. 2, the building comprises a façade 164 (e.g., one side of a four-sided rectangular building) having a window 166 for allowing sunlight to enter the space. The space 160 also comprises a work surface, e.g., a table 168, which has a height $h_{WORK}$. The motorized roller shade 104 is mounted above the window 166 and comprises a roller tube 172 around which the shade fabric 170 is wrapped. The shade fabric 170 may have a hembar 174 at the lower edge of the shade fabric. The electronic drive unit 130 rotates the roller tube 172 to move the shade fabric 170 between the fully-open position $P_{FO}$ (in which the window 166 is not covered) and the fully-closed position $P_{FC}$ (in which the window 166 is fully covered). Further, the electronic drive unit 130 may control the position of the shade fabric 170 to one of a plurality of preset positions between the fully-open position $P_{FO}$ and the fully-closed position $P_{FC}$.

The sunlight penetration distance $d_{PEN}$ is the distance from the window 166 and the façade 164 at which direct sunlight shines into the room. The sunlight penetration distance $d_{PEN}$ is a function of a height $h_{WIN}$ of the window 166 and an angle $\phi_F$ of the façade 164 with respect to true north, as well as a solar elevation angle $\theta_S$ and a solar azimuth angle $\phi_S$, which define the position of the sun in the sky. The solar elevation angle $\theta_S$ and the solar azimuth angle $\phi_S$ are functions of the present date and time, as well as the position (i.e., the longitude and latitude) of the building 162 in which the space 160 is located. The solar elevation angle $\theta_S$ is essentially the angle between a line directed towards the sun and a line directed towards the horizon at the position of the building 162. The solar elevation angle $\theta_S$ can also be thought of as the angle of incidence of the sun's rays on a horizontal surface. The solar azimuth angle $\phi_S$ is the angle formed by the line from the observer to true north and the line from the observer to the sun projected on the ground. When the solar elevation angle $\theta_S$ is small (i.e., around sunrise and sunset), small changes in the position of the sun result in relatively large changes in the magnitude of the sunlight penetration distance $d_{PEN}$.

Figure 3A:
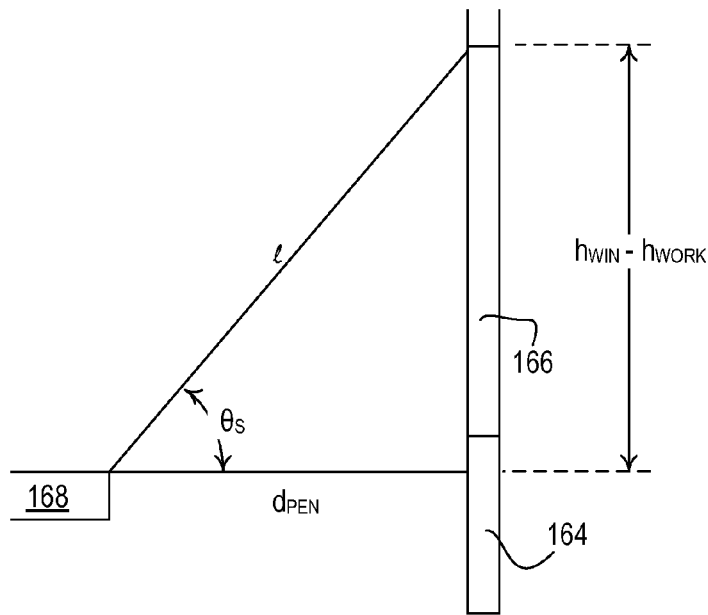
FIG. 3A is a side view of the window of FIG. 2 illustrating a sunlight penetration depth.

The sunlight penetration distance $d_{PEN}$ of direct sunlight onto the table 168 of the space 160 (which is measured normal to the surface of the window 166) can be determined by considering a triangle formed by the length l of the deepest penetrating ray of light (which is parallel to the path of the ray), the difference between the height $h_{WIN}$ of the window 166 and the height $h_{WORK}$ of the table 168, and distance between the table and the wall of the façade 164 (i.e., the sunlight penetration distance $d_{PEN}$) as shown in the side view of the window 166 in FIG. 3A, i.e., $$\tan(\theta_S) = (h_{WIN} - h_{WORK})/l, \qquad \text{(Equation 1)}$$

where $\theta_S$ is the solar elevation angle of the sun at a given date and time for a given location (i.e., longitude and latitude) of the building 162.

If the sun is directly incident upon the window 166, a solar azimuth angle $\phi_S$ and the façade angle $\phi_F$ (i.e., with respect to true north) are equal as shown by the top view of the window

Figure 3B:
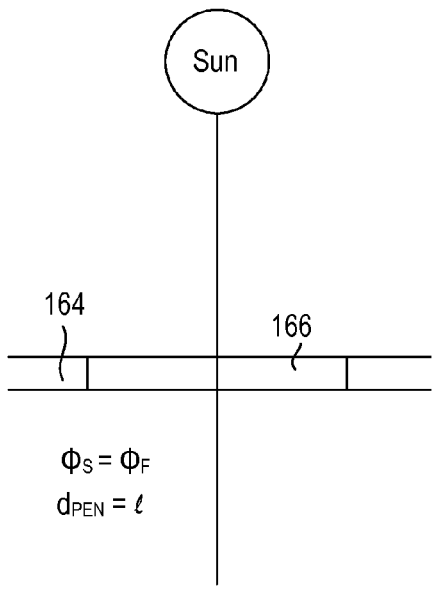
FIG. 3B is a top view of the window of FIG. 2 when the sun is directly incident upon the window.
Figure 3C:
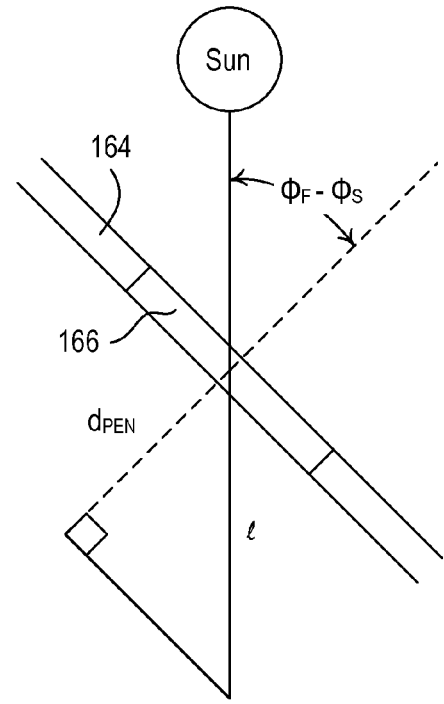
FIG. 3C is a top view of the window of FIG. 2 when the sun is not directly incident upon the window.

166 in FIG. 3B. Accordingly, the sunlight penetration distance $d_{PEN}$ equals the length $l$ of the deepest penetrating ray of light. However, if the façade angle $\phi_F$ is not equal to the solar azimuth angle $\phi_S$, the sunlight penetration distance $d_{PEN}$ is a function of the cosine of the difference between the façade angle $\phi_F$ and the solar azimuth angle $\phi_S$, i.e., $$d_{PEN} = l \cdot \cos(|\phi_F - \phi_S|), \tag{Equation 2}$$

as shown by the top view of the window 166 in FIG. 3C.

As previously mentioned, the solar elevation angle $\theta_S$ and the solar azimuth angle $\phi_S$ define the position of the sun in the sky and are functions of the position (i.e., the longitude and latitude) of the building 162 in which the space 160 is located and the present date and time. The following equations are necessary to approximate the solar elevation angle $\theta_S$ and the solar azimuth angle $\phi_S$. The equation of time defines essentially the difference in a time as given by a sundial and a time as given by a clock. This difference is due to the obliquity of the Earth's axis of rotation. The equation of time can be approximated by $$E = 9.87 \cdot \sin(2B) - 7.53 \cdot \cos(B) - 1.5 \cdot \sin(B), \tag{Equation 3}$$

where $B = [360° \cdot (N_{DAY} - 81)]/364$, and $N_{DAY}$ is the present day-number for the year (e.g., $N_{DAY}$ equals one for January 1, $N_{DAY}$ equals two for January 2, and so on).

The solar declination $\delta$ is the angle of incidence of the rays of the sun on the equatorial plane of the Earth. If the eccentricity of Earth's orbit around the sun is ignored and the orbit is assumed to be circular, the solar declination is given by:

$$\delta = 23.45° \cdot \sin[360°/365 \cdot (N_{DAY} + 284)]. \tag{Equation 4}$$

The solar hour angle H is the angle between the meridian plane and the plane formed by the Earth's axis and current location of the sun, i.e., $$H(t) = \{\tfrac{1}{4} \cdot [t + E - (4 \cdot \lambda) + (60 \cdot t_{TZ})]\} - 180°, \tag{Equation 5}$$

where $t$ is the present local time of the day, $\lambda$ is the local longitude, and $t_{TZ}$ is the time zone difference (in unit of hours) between the local time $t$ and Greenwich Mean Time (GMT). For example, the time zone difference $t_{TZ}$ for the Eastern Standard Time (EST) zone is $-5$. The time zone difference $t_{TZ}$ can be determined from the local longitude $\lambda$ and latitude $\Phi$ of the building 162. For a given solar hour angle H, the local time can be determined by solving Equation 5 for the time $t$, i.e., $$t = 720 + 4 \cdot (H + \lambda) - (60 \cdot t_{TZ}) - E. \tag{Equation 6}$$

When the solar hour angle H equals zero, the sun is at the highest point in the sky, which is referred to as "solar noon" time $t_{SN}$, i.e., $$t_{SN} = 720 + (4 \cdot \lambda) - (60 \cdot t_{TZ}) - E. \tag{Equation 7}$$

A negative solar hour angle H indicates that the sun is east of the meridian plane (i.e., morning), while a positive solar hour angle H indicates that the sun is west of the meridian plane (i.e., afternoon or evening).

The solar elevation angle $\theta_S$ as a function of the present local time $t$ can be calculated using the equation:

$$\theta_S(t) = \sin^{-1}[\cos(H(t)) \cdot \cos(\delta) \cdot \cos(\Phi) + \sin(\delta) \cdot \sin(\Phi)], \tag{Equation 8}$$

wherein $\Phi$ is the local latitude. The solar azimuth angle $\phi_S$ as a function of the present local time $t$ can be calculated using the equation:

$$\phi_S(t) = 180° \cdot C(t) \cdot \cos^{-1}[X(t)/\cos(\theta_S(t))], \tag{Equation 9}$$

where $$X(t) = [\cos(H(t)) \cdot \cos(\delta) \cdot \sin(\Phi) - \sin(\delta) \cdot \cos(\Phi)], \tag{Equation 10}$$

and $C(t)$ equals negative one if the present local time $t$ is less than or equal to the solar noon time $t_{SN}$ or one if the present local time $t$ is greater than the solar noon time $t_{SN}$. The solar azimuth angle $\phi_S$ can also be expressed in terms independent of the solar elevation angle $\theta_S$, i.e., $$\phi_S(t) = \tan^{-1}[-\sin(H(t)) \cdot \cos(\delta)/Y(t)], \tag{Equation 11}$$

where $$Y(t) = [\sin(\delta) \cdot \cos(\Phi) - \cos(\delta) \cdot \sin(\Phi) \cdot \cos(H(t))]. \tag{Equation 12}$$

Thus, the solar elevation angle $\theta_S$ and the solar azimuth angle $\phi_S$ are functions of the local longitude $\lambda$ and latitude $\Phi$ and the present local time $t$ and date (i.e., the present day-number $N_{DAY}$). Using Equations 1 and 2, the sunlight penetration distance can be expressed in terms of the height $h_{WIN}$ of the window 166, the height $h_{WORK}$ of the table 168, the solar elevation angle $\theta_S$, and the solar azimuth angle $\phi_S$.

According to a first embodiment of the present invention, the motorized roller shades 104 are controlled such that the sunlight penetration distance $d_{PEN}$ is limited to less than a desired maximum sunlight penetration distance $d_{MAX}$ during all times of the day. For example, the sunlight penetration distance $d_{PEN}$ may be limited such that the sunlight does not shine directly on the table 168 to prevent sun glare on the table. The desired maximum sunlight penetration distance $d_{MAX}$ may be entered using the GUI software of the PC 150 and may be stored in memory in each of the lighting hubs 140. In addition, the user may also use the GUI software of the PC 150 to enter and the present date and time, the present timezone, the local longitude $\lambda$ and latitude $\Phi$ of the building 162, the façade angle $\phi_F$ for each façade 164 of the building, the height $h_{WIN}$ of the windows 166 in spaces 160 of the building, and the heights $h_{WORK}$ of the workspaces (i.e., tables 168) in the spaces of the building. These operational characteristics (or a subset of these operational characteristics) may also be stored in the memory of each lighting hub 140. Further, the motorized roller shades 104 are also controlled such that distractions to an occupant of the space 160 (i.e., due to movements of the motorized roller shades) are minimized, for example, by only opening and closing each motorized roller shade once each day resulting in only two movements of the shades each day.

Figure 4:
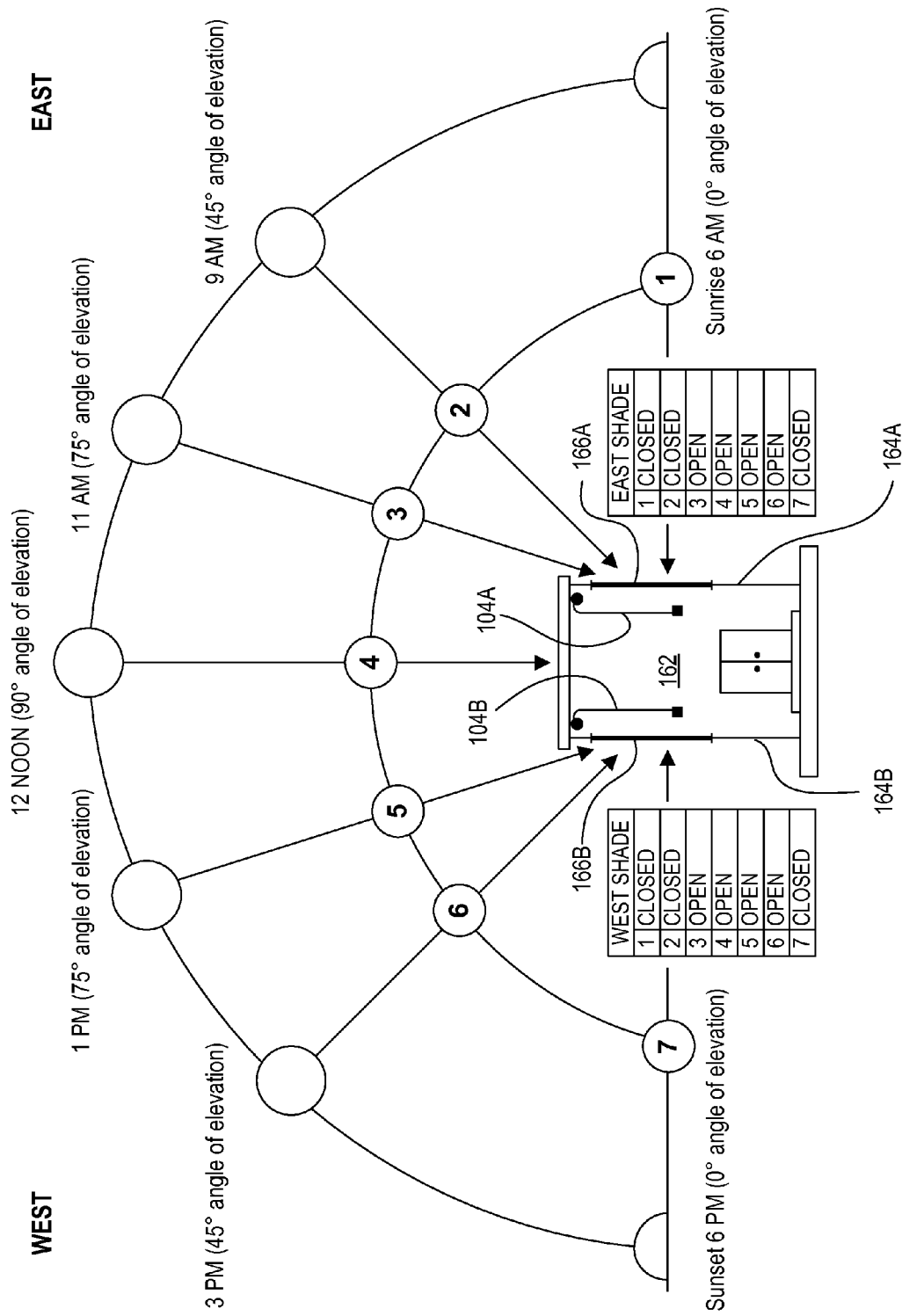
FIG. 4 is a high-level diagram illustrating a simple example of the operation of the motorized roller shades of the load control system of FIG. 1 between sunrise and sunset.

FIG. 4 is a high-level diagram illustrating a simple example of the operation of the motorized roller shades 104 between sunrise and sunset according to the first embodiment of the present invention. In the example of FIG. 4, the building 162 is located on the equator and the time of year is the spring equinox. The building includes a first eastern façade 164A facing east and having a first window 166A and a first motorized roller shade 104A, and a second western façade 164B facing west and having a second window 166B and a second motorized roller shade 104B. At event one (1), the sun is just rising at 6 a.m., and positioned at a solar elevation angle $\theta_S$ of zero (0) degrees in the eastern sky. At this time of day, the first motorized roller shade 104A of the eastern façade 164A is programmed to be fully closed to prevent glare from the direct light of the sun. On the other hand, the second motorized roller shade 104B of the western façade 164B is programmed to be fully open at event one to allow the maximum amount of indirect sunlight to illuminate the interior of the building 162.

At event two (2), the time is 9 a.m., and the sun has risen to a solar elevation angle $\theta_S$ of 45 degrees in the eastern sky. The first and second motorized roller shades 104A, 104B have not changed position since event one. At event three (3), the time is 11 a.m., and the sun has risen to a solar elevation angle $\theta_S$ of 75 degrees in the eastern sky. The second motorized roller shade 104B of the western façade 164B remains in the opened position, while the first motorized roller shade 104A of the eastern façade 164A moves to the fully-open position $P_{FO}$ since the sun has risen to a solar elevation angle $\theta_S$ that no longer creates sun glare on work surfaces in the building 162 (i.e., a solar elevation angle that no longer causes the sunlight penetration distance $d_{PEN}$ to exceed the desired maximum sunlight penetration distance $d_{MAX}$). During events four (4) and five (5), the first and second motorized roller shades 104A, 104B remain opened. At event six (6), the time is 3 p.m., and the sun has dropped to a solar elevation angle $\theta_S$ of 45 degrees in the western sky (or 135 degrees with respect to the eastern sky). At this time, the second motorized roller shade 104B of the western façade 164B closes to prevent glare at the west side of the building 162. Finally, at event seven (7), which is 6 p.m., the second motorized roller shade 104B remains closed, and the first motorized roller shade 104A is closed to provide additional insulation of the building 162 and to maintain a consistent outward appearance throughout the evening.

Figure 5:
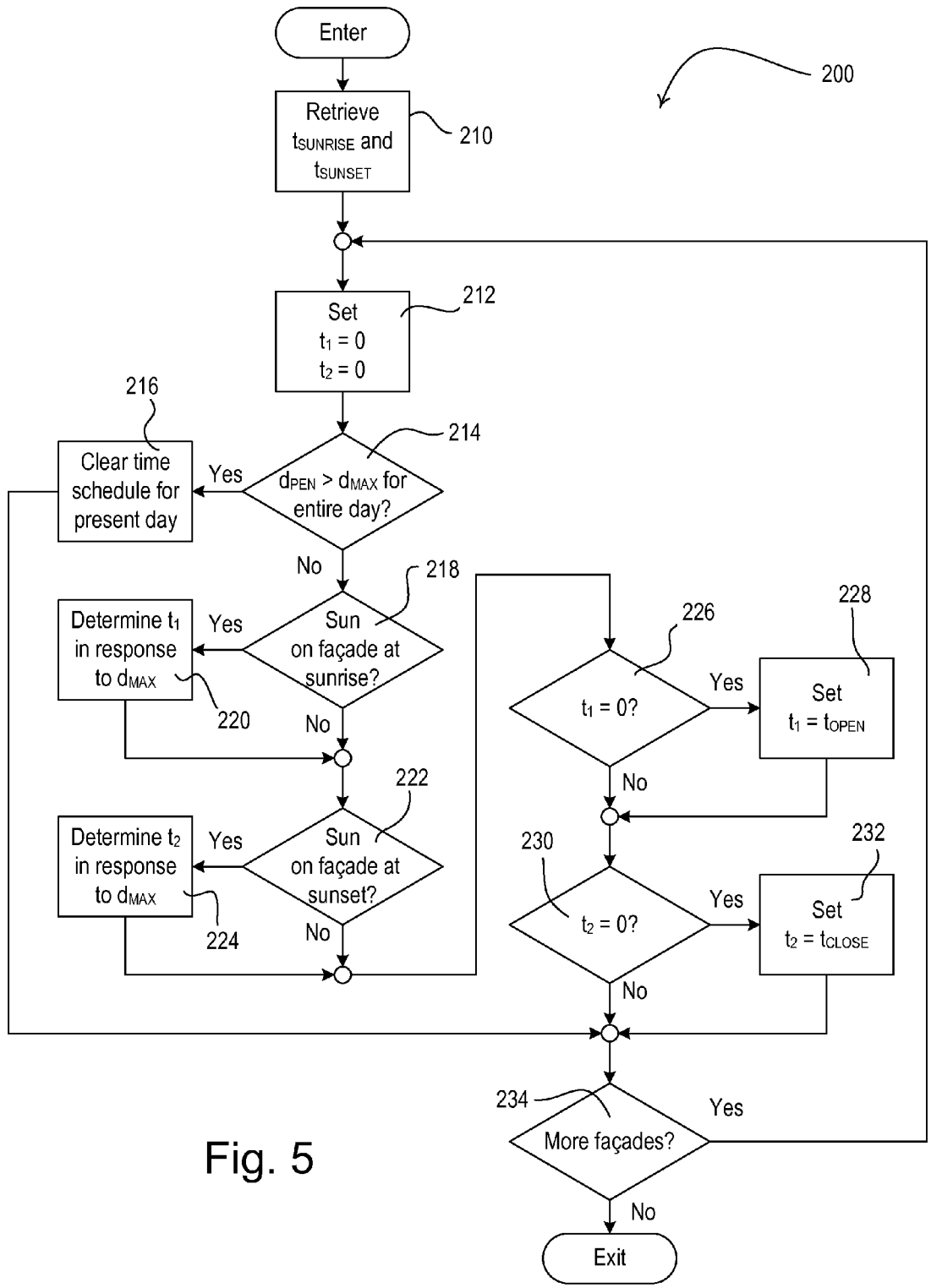
FIG. 5 is a simplified flowchart of a timeclock configuration procedure executed periodically by a central controller of the load control system of FIG. 1 according to a first embodiment of the present invention.

FIG. 5 is a simplified flowchart of a timeclock configuration procedure 200 according to the first embodiment of the present invention. The timeclock configuration procedure 200 is executed periodically by each of the lighting hubs 140 of the load control system 100 to generate a timeclock schedule defining the desired operation of the motorized roller shades 104 of each of the façades 164 of the building 162. For example, the timeclock configuration procedure 200 may be executed by each of the lighting hubs 140 once each day at midnight to generate a new timeclock schedule for the motorized roller shades 104 connected to the respective lighting hub via the shade communication link 132. During the timeclock configuration procedure 200, the lighting hub 140 sets an open time $t_1$ and a close time $t_2$ for each of the timeclock schedules, i.e., for each façade 164 of the building 162 on which the motorized roller shades 104 connected to the lighting hub are located. If the sun is incident on the façade 164 at sunrise, the lighting hub 140 is operable to determine the open time $t_1$ to ensure that the sunlight penetration distance $d_{PEN}$ does not exceed the desired maximum sunlight penetration distance $d_{MAX}$ for the respective façade. Specifically, the lighting hub 140 is operable to calculate the time at which the sunlight penetration distance $d_{PEN}$ will fall below the desired maximum sunlight penetration distance $d_{MAX}$ after sunrise using Equations 1-12 shown above. If the sun is incident on the façade 164 at sunset, the lighting hub 140 is operable to determine the close time $t_2$ to ensure that the sunlight penetration distance $d_{PEN}$ does not exceed the desired maximum sunlight penetration distance $d_{MAX}$ by calculating the time at which the sunlight penetration distance $d_{PEN}$ will rise above the desired maximum sunlight penetration distance $d_{MAX}$.

Referring to FIG. 5, the lighting hub 140 first retrieves the sunrise time $t_{SUNRISE}$ and the sunset time $t_{SUNSET}$ for the present day (i.e., the 24-hour period starting at midnight when the timeclock configuration procedure 200 is executed) from the astronomical timeclock at step 210. At step 212, the lighting hub 140 initializes the open time $t_1$ and the close time $t_2$ to zero. If the sunlight penetration distance $d_{PEN}$ is greater than the desired maximum sunlight penetration distance $d_{MAX}$ for all times between the sunrise time $t_{SUNRISE}$ and the sunset time $t_{SUNSET}$ at step 214, the lighting hub 140 clears the time schedule for the present day at step 216, such that the roller shades 104 on that façade 164 will not open and will remain closed for the entire day.

If the sun will be on the façade 164 at sunrise at step 218 (e.g., if $|\phi_F - \phi_S| < 90°$ at a time just after sunrise), the lighting hub 140 determines the open time $t_1$ in response to the desired maximum sunlight penetration distance $d_{MAX}$ using Equations 1-12 at step 220. If the sun will be on the façade 164 at sunset at step 222 (e.g., if $|\phi_F - \phi_S| < 90°$ at a time just before sunset), the lighting hub 140 determines the close time $t_2$ in response to the desired maximum sunlight penetration distance $d_{MAX}$ at step 224. If the open time $t_1$ is equal to zero at step 226 (i.e., the sun will not be on the façade 164 at sunrise), the lighting hub 140 sets the open time $t_1$ to an arbitrary open time $t_{OPEN}$ (e.g., 7 a.m.) at step 228, such that the roller shades 104 will be open for the entire day until the close time $t_2$. If the close time $t_2$ is equal to zero at step 230 (i.e., the sun will not be on the façade 164 at sunset), the lighting hub 140 sets the close time $t_2$ to an arbitrary close time $t_{CLOSE}$ (e.g., 7 p.m.) at step 232, such that the roller shades 104 will be closed for the entire night. If there are time schedules for more façades 164 of the building 162 that must be updated at step 234, the timeclock configuration procedure 200 loops around to set the open time $t_1$ and the close time $t_2$ for another façade. Otherwise, the timeclock configuration procedure 200 exits.

Figure 6:
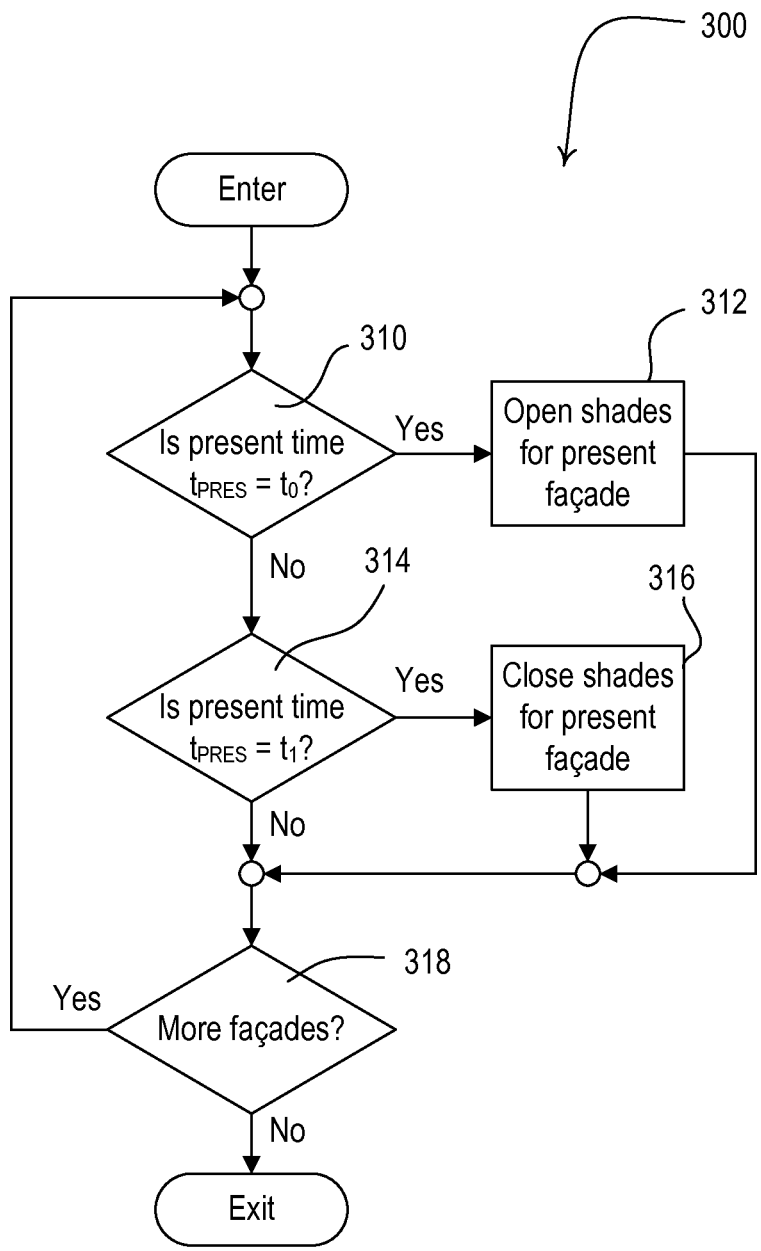
FIG. 6 is a simplified flowchart of a timeclock execution procedure executed periodically by the central controller of the load control system of FIG. 1 according to the first embodiment of the present invention.

FIG. 6 is a simplified flowchart of a time schedule execution procedure 300 executed periodically, e.g., once every minute, by the lighting hubs 140. If the present time $t_{PRES}$ determined from the astronomical timeclock is equal to the open time $t_1$ at step 310, the lighting hub 140 transmits a digital command to open the motorized roller shade 104 of the present façade 164 at step 312. If the present time $t_{PRES}$ is equal to the close time $t_2$ at step 314, the lighting hub 140 transmits a digital command to close the motorized roller shade 104 of the present façade 164 at step 316. If there are more façades 164 having time schedule event times to review at step 318, the procedure 300 loops to potentially open or close the motorized roller shades 104 of another façade. Otherwise, the procedure 300 exits.

According to a second embodiment of the present invention, the motorized roller shades 104 are operable to move more than twice each day and may be controlled to preset positions between the fully-open position $P_{FO}$ and the fully-closed position $P_{FC}$. During a timeclock schedule of the second embodiment, the motorized roller shades 104 are controlled to the preset positions between the fully-open position $P_{FO}$ and the fully-closed position $P_{FC}$, such that the sunlight penetration distance $d_{PEN}$ is limited to less than the desired maximum sunlight penetration distance $d_{MAX}$. In order to minimize distractions of an occupant in the space 160 due to roller shade movements, the user may input a minimum time period $T_{MIN}$ that may exist between any two consecutive movements of the motorized roller shades. The minimum time period $T_{MIN}$ that may exist between any two consecutive movements of the motorized roller shades and the desired maximum sunlight penetration distance $d_{MAX}$ may be entered using the GUI software of the PC 150 and may be stored in the memory in the lighting hubs 140. The user may select different values for the desired maximum sunlight penetration distance $d_{MAX}$ and the minimum time period $T_{MIN}$ between shade movements for different areas and different groups of motorized roller shades 104 in the building 162. In other words, a different timeclock schedule may be executed for the different areas and different groups of motorized roller shades 104 in the building 162 (i.e., the different façades 164 of the building).

Figure 7:
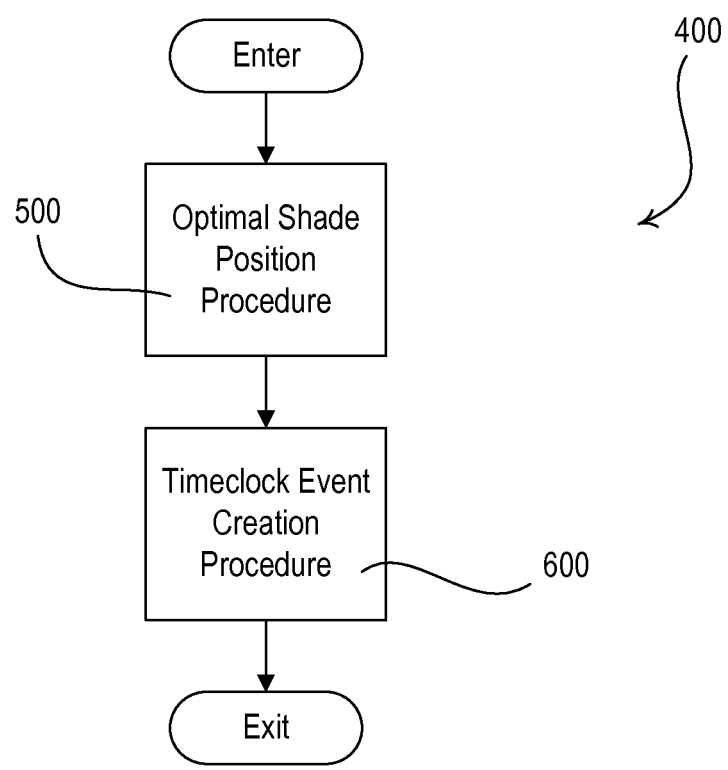
FIG. 7 is a simplified flowchart of a timeclock configuration procedure executed periodically by the central controller of the load control system of FIG. 1 according to a second embodiment of the present invention.

FIG. 7 is a simplified flowchart of a timeclock configuration procedure 400 executed periodically by the lighting hub 140 of the load control system 100 to generate a timeclock schedule defining the desired operation of the motorized roller shades 104 of each of the façades 164 of the building 162 according to the second embodiment of the present invention. For example, the timeclock configuration procedure 400 may be executed once each day at midnight to generate a new timeclock schedule for one or more areas in the building 162. The timeclock schedule is executed between a start time $t_{START}$ and an end time $t_{END}$ of the present day. During the timeclock configuration procedure 400, the lighting hub 140 first performs an optimal shade position procedure 500 for determining optimal shade positions $P_{OPT}(t)$ of the motorized roller shades 104 in response to the desired maximum sunlight penetration distance $d_{MAX}$ for each minute between the start time $t_{START}$ and the end time $t_{END}$ of the present day. The lighting hub 140 then executes a timeclock event creation procedure 600 to generate the events of the timeclock schedule in response to the optimal shade positions $P_{OPT}(t)$ and the user-selected minimum time period $T_{MIN}$ between shade movements.

According to the second embodiment of the present invention, the timeclock schedule is split up into a number of consecutive time intervals, each having a length equal to the minimum time period $T_{MIN}$ between shade movements. The lighting hub 140 considers each time interval and determines a position to which the motorized roller shades 104 should be controlled in order to prevent the sunlight penetration distance $d_{PEN}$ from exceeding the desired maximum sunlight penetration distance $d_{MAX}$ during the respective time interval. The lighting hub 140 creates events in the timeclock schedule, each having an event time equal to beginning of respective time interval and a corresponding position equal to the determined position to which the motorized roller shades 104 should be controlled in order to prevent the sunlight penetration distance $d_{PEN}$ from exceeding the desired maximum sunlight penetration distance $d_{MAX}$. However, the lighting hub 140 will not create a timeclock event when the determined position of a specific time interval is equal to the determined position of a preceding time interval (as will be described in greater detail below). Therefore, the event times of the timeclock schedule are spaced apart by multiples of the user-specified minimum time period $T_{MIN}$ between shade movements.

Figure 8:
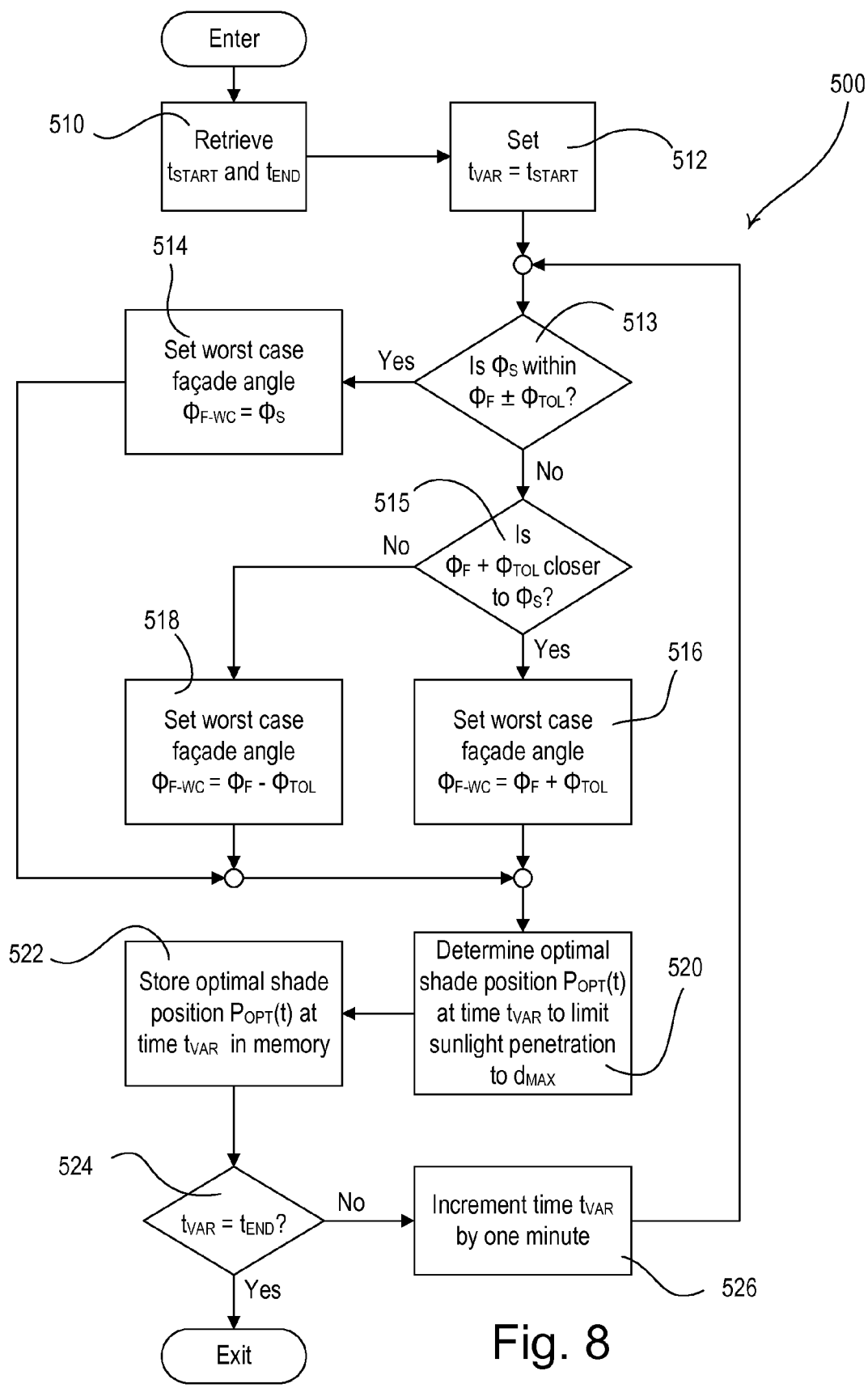
FIG. 8 is a simplified flowchart of an optimal shade position procedure executed by the central controller of the load control system of FIG. 1 according to the second embodiment of the present invention.

FIG. 8 is a simplified flowchart of the optimal shade position procedure 500, which is executed by the lighting hub 140 to generate the optimal shade positions $P_{OPT}(t)$ for each minute between the start time $t_{START}$ and the end time $t_{END}$ of the timeclock schedule such that the sunlight penetration distance $d_{PEN}$ will not exceed the desired maximum sunlight penetration distance $d_{MAX}$. The lighting hub 140 first retrieves the start time $t_{START}$ and the end time $t_{END}$ of the timeclock schedule for the present day at step 510. For example, the lighting hub 140 could use the astronomical timeclock to set the start time $t_{START}$ equal to the sunrise time $t_{SUNRISE}$ for the present day, and the end time $t_{END}$ equal to the sunset time $t_{SUNSET}$ for the present day. Alternatively, the start and end times $t_{START}$, $t_{END}$ could be set to arbitrary times, e.g., 6 A.M. and 6 P.M, respectively.

Next, the lighting hub 140 sets a variable time $t_{VAR}$ equal to the start time $t_{START}$ at step 512 and determines a worst case façade angle $\phi_{F-WC}$ at the variable time $t_{VAR}$ to use when calculating the optimal shade position $P_{OPT}(t)$ at the variable time $t_{VAR}$. Specifically, if the solar azimuth angle $\phi_S$ is within a façade angle tolerance $\phi_{TOL}$ (e.g., approximately 3°) of the fixed façade angle $\phi_F$ at step 513 (i.e., if $\phi_F - \phi_{TOL} \leq \phi_S \leq \phi_F + \phi_{TOL}$), the lighting hub 140 sets the worst case façade angle $\phi_{F-WC}$ equal to the solar azimuth angle $\phi_S$ of the façade 164 at step 514. If the solar azimuth angle $\phi_S$ is not within the façade angle tolerance $\phi_{TOL}$ of the façade angle $\phi_F$ at step 513, the lighting hub 140 then determines if the façade angle $\phi_F$ plus the façade angle tolerance $\phi_{TOL}$ is closer to the solar azimuth angle $\phi_S$ than the façade angle $\phi_F$ minus the façade angle tolerance $\phi_{TOL}$ at step 515. If so, the lighting hub 140 sets the worst case façade angle $\phi_{F-WC}$ equal to the façade angle $\phi_F$ plus the façade angle tolerance $\phi_{TOL}$ at step 516. If the façade angle $\phi_F$ plus the façade angle tolerance $\phi_{TOL}$ is not closer to the solar azimuth angle $\phi_S$ than the façade angle $\phi_F$ minus the façade angle tolerance $\phi_{TOL}$ at step 515, the lighting hub 140 sets the worst case façade angle $\phi_{F-WC}$ equal to the façade angle $\phi_F$ minus the façade angle tolerance $\phi_{TOL}$ at step 518.

At step 520, the lighting hub 140 uses Equations 1-12 shown above and the worst case façade angle $\phi_{F-WC}$ to calculate the optimal shade position $P_{OPT}(t_{VAR})$ that is required in order to limit the sunlight penetration distance $d_{PEN}$ to the desired maximum sunlight penetration distance $d_{MAX}$ at the variable time $t_{VAR}$. At step 522, the lighting hub 140 stores in the memory the optimal shade position $P_{OPT}(t_{VAR})$ determined in step 520. If the variable time $t_{VAR}$ is not equal to the end time $t_{END}$ at step 524, the lighting hub 140 increments the variable time $t_{VAR}$ by one minute at step 526 and determines the worst case façade angle $\phi_{F-WC}$ and the optimal shade position $P_{OPT}(t_{VAR})$ for the new variable time $t_{VAR}$ at step 520. When the variable time $t_{VAR}$ is equal to the end time $t_{END}$ at step 524, the optimal shade position procedure 500 exits.

Figure 9B:
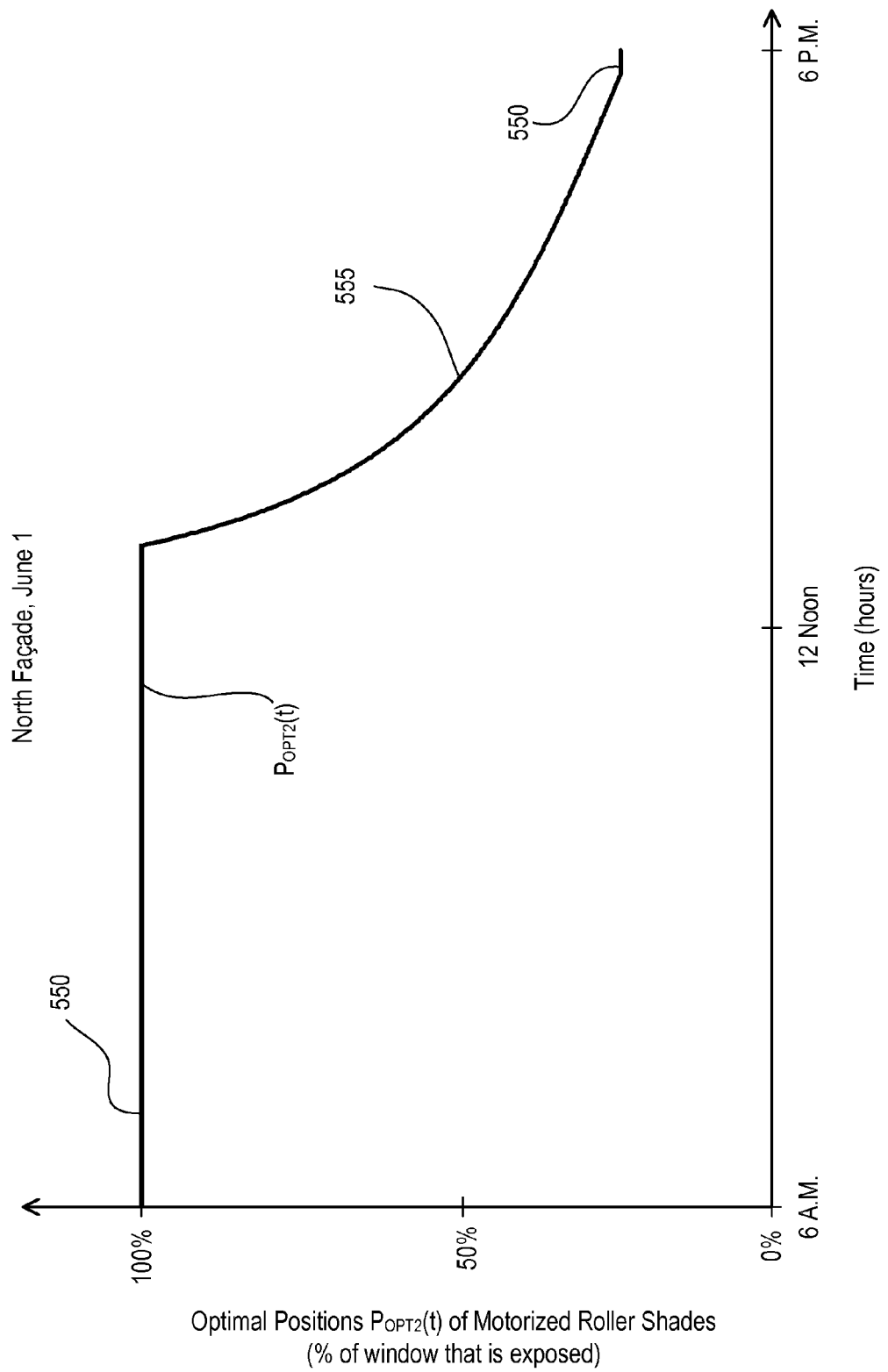
Figure 9C:
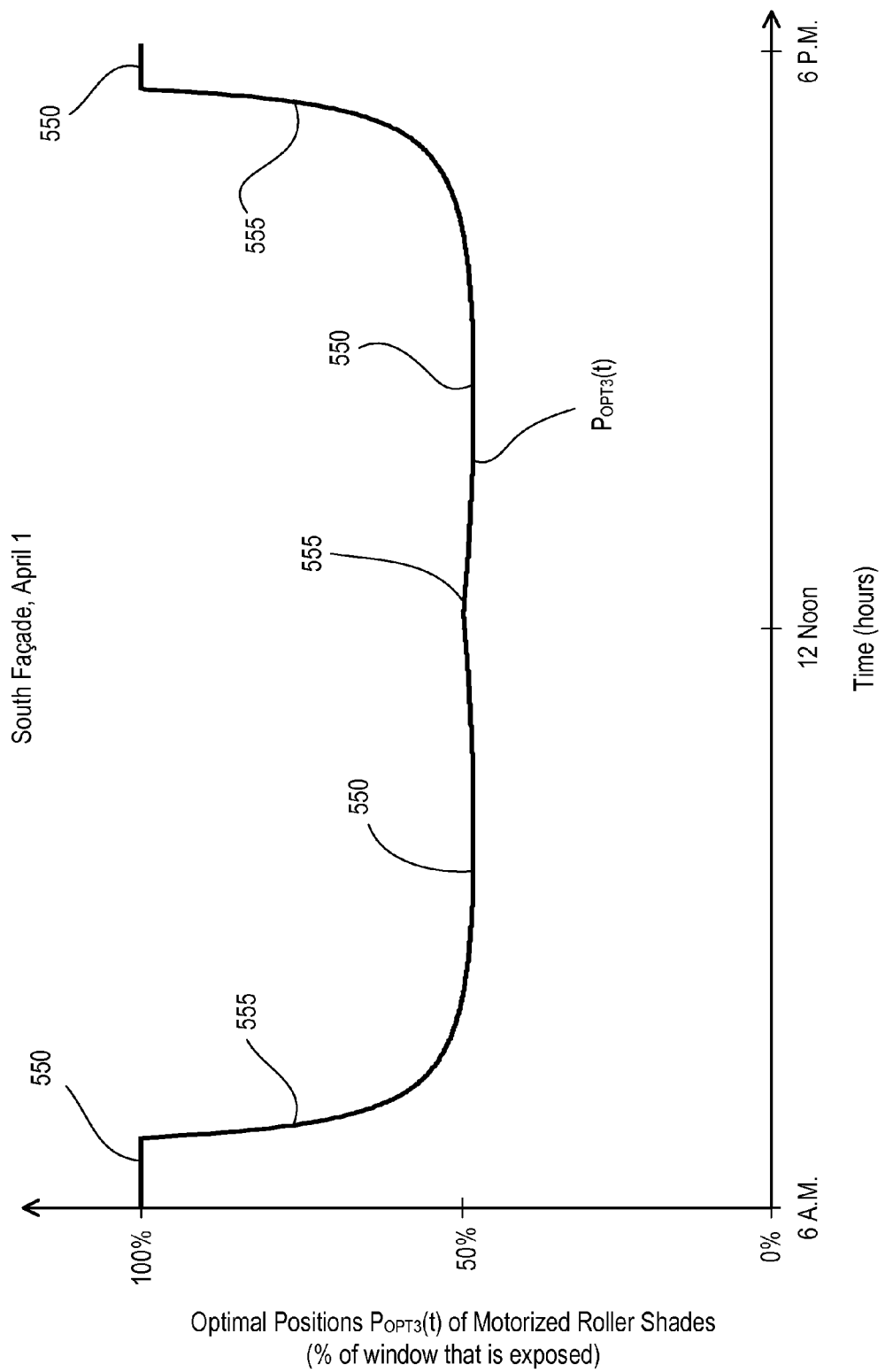

Thus, the lighting hub 140 generates the optimal shade positions $P_{OPT}(t)$ between the start time $t_{START}$ and the end time $t_{END}$ of the timeclock schedule using the optimal shade position procedure 500. FIG. 9A shows an example plot of optimal shade positions $P_{OPT1}(t)$ of the motorized roller shades 104 on the west façade of the building 162 on January 1, where the building is located at a longitude $\lambda$ of approximately 75° W and a latitude $\Phi$ of approximately 40° N. FIG. 9B shows an example plot of optimal shade positions $P_{OPT2}(t)$ of the motorized roller shades 104 on the north façade of the same building 162 on June 1. FIG. 9C shows an example plot of optimal shade positions $P_{OPT3}(t)$ of the motorized roller shades 104 on the south façade of the same building 162 on April 1.

Figure 10:
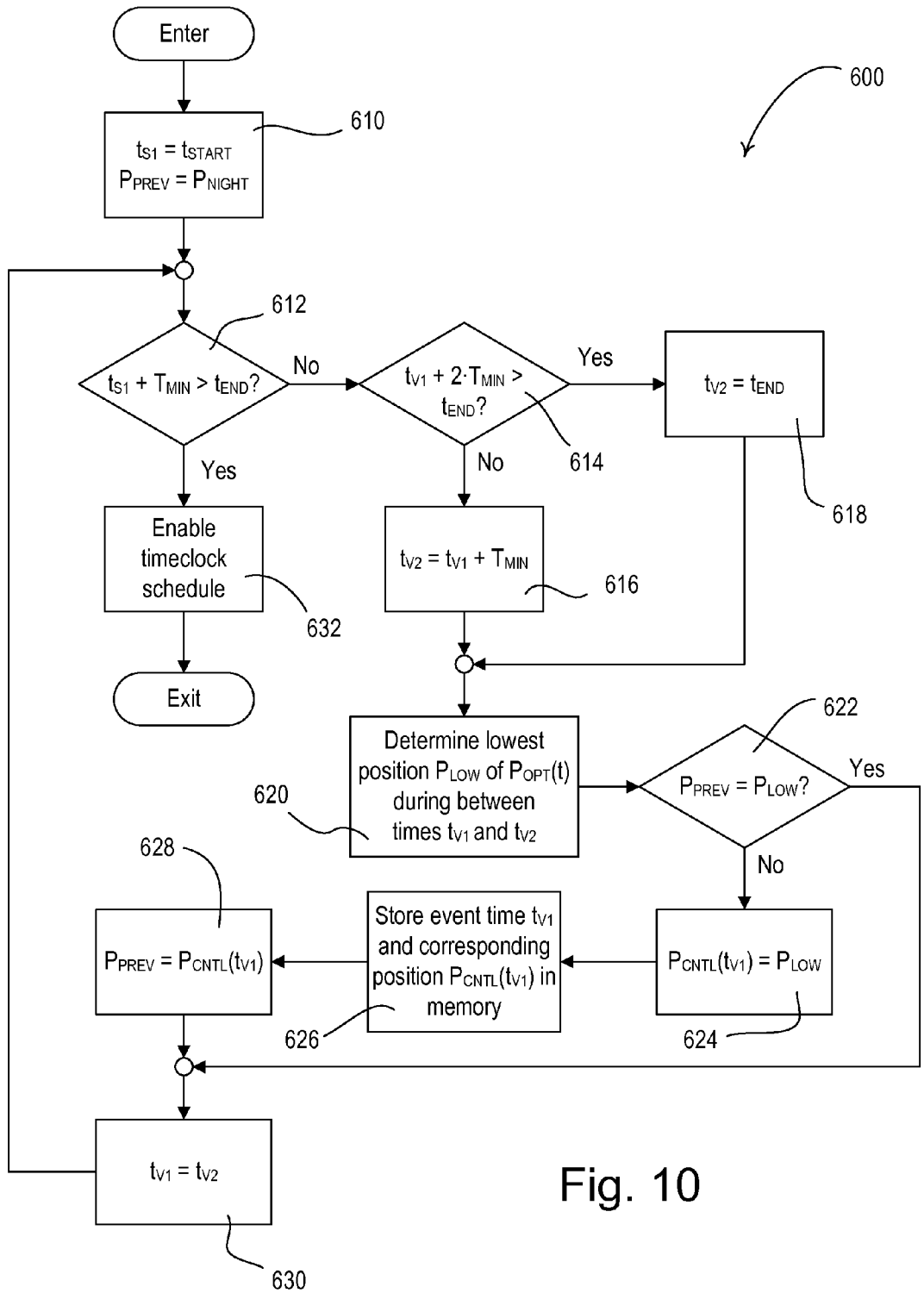
FIG. 10 is a simplified flowchart of a timeclock event creation procedure executed by the central controller of the load control system of FIG. 1 according to the second embodiment of the present invention.

FIG. 10 is a simplified flowchart of the timeclock event creation procedure 600, which is executed by the lighting hub 140 in order to generate the events of the timeclock schedule according to the second embodiment of the present invention. Since the timeclock schedule is split up into a number of consecutive time intervals, the timeclock events of the timeclock schedule are spaced between the start time $t_{START}$ and the end time $t_{END}$ by multiples of the minimum time period $T_{MIN}$ between shade movements, which is selected by the user. During the timeclock event creation procedure 600, the lighting hub 140 generates controlled shade positions $P_{CNTL}(t)$, which comprise a number of discrete events, i.e., step changes in the position of the motorized roller shades at the specific event times. The lighting hub 140 uses the optimal shade positions $P_{OPT}(t)$ from the optimal shade position procedure 500 to correctly determine the controlled shade positions $P_{CNTL}(t)$ of the events of the timeclock schedule. The resulting timeclock schedule includes a number of events, which are each characterized by an event time and a corresponding preset shade position. According to the second embodiment of the present invention, the timeclock events are spaced apart by periods of time that are multiples of the minimum time period $T_{MIN}$. The lighting hub 140 uses the controlled shade positions $P_{CNTL}(t)$ to adjust the position of the motorized roller shades 104 during execution of the timeclock schedule, i.e., between the start time $t_{START}$ and the end time $t_{END}$. At the end time $t_{END}$, the lighting hub 140 controls the position of the motorized roller shades 104 to a nighttime position $P_{NIGHT}$ (e.g., the fully-closed position $P_{FC}$) as will be described in greater detail below with reference to FIG. 12.

Figure 11B:
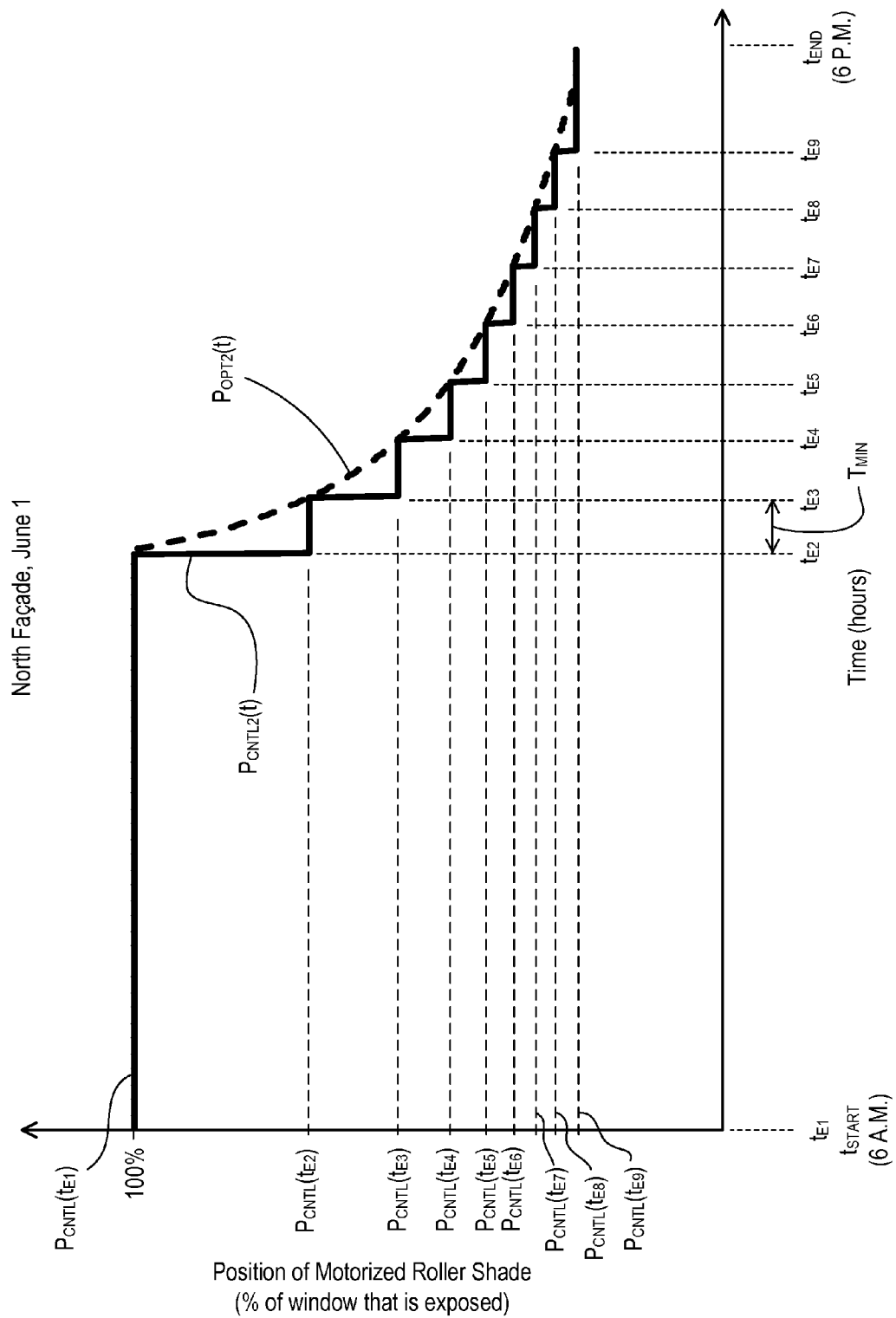
Figure 11C:
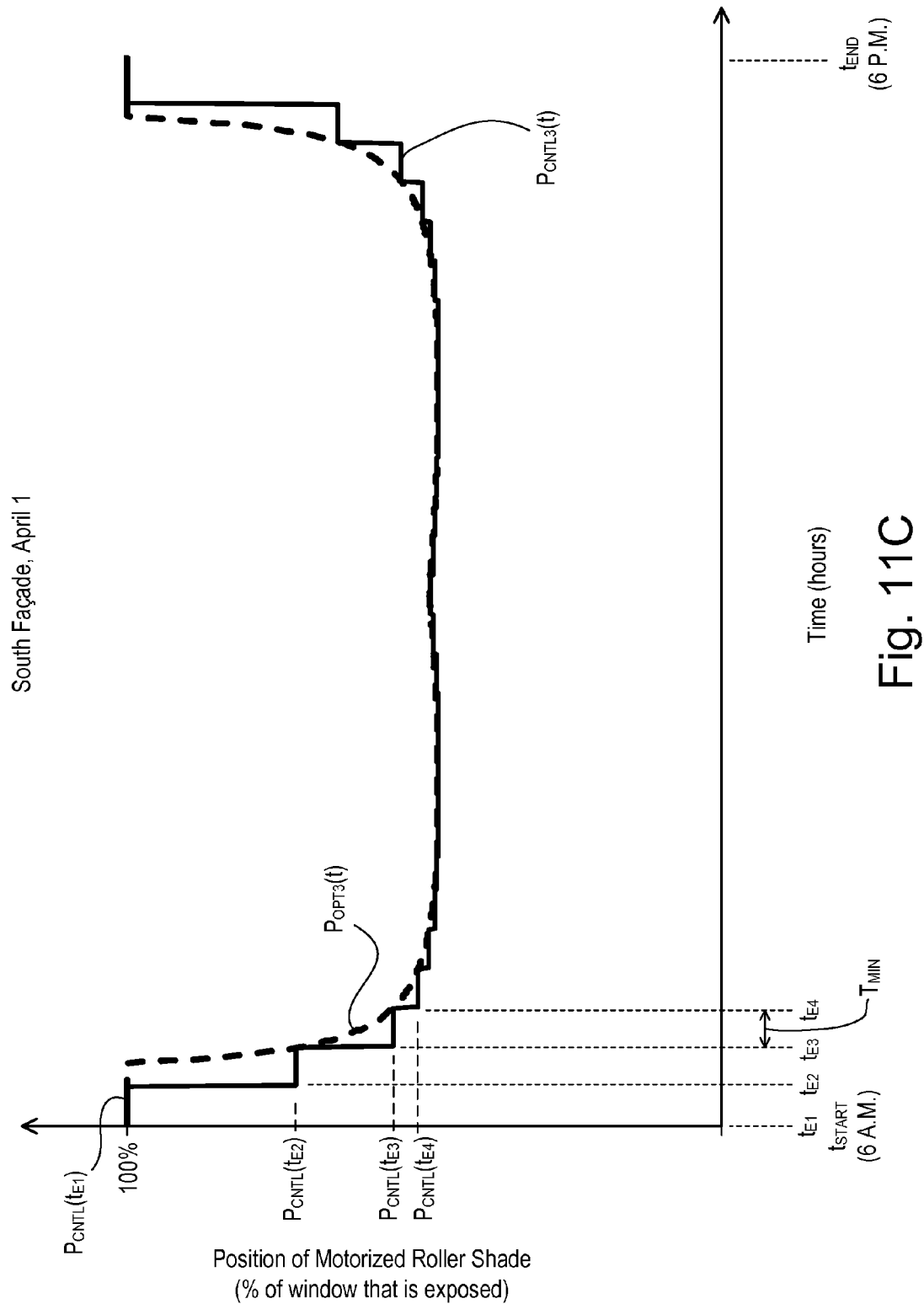

FIG. 11A shows an example plot of controlled shade positions $P_{CNTL1}$(t) of the motorized roller shades 104 on the west façade of the building 162 on January 1 according to the second embodiment of the present invention. FIG. 11B shows an example plot of controlled shade positions $P_{CNTL2}$(t) of the motorized roller shades 104 on the north façade of the building 162 on June 1 according to the second embodiment of the present invention. FIG. 11C shows an example plot of controlled shade positions $P_{CNTL3}$(t) of the motorized roller shades 104 on the south façade of the building 162 on April 1 according to the second embodiment of the present invention.

The lighting hub 140 examines the values of the optimal shade positions $P_{OPT}$(t) during each of the time intervals of the timeclock schedule (i.e., the time periods between two consecutive timeclock events) to determine the lowest shade position $P_{LOW}$ during each of the time intervals. During the timeclock event creation procedure 600, the lighting hub 140 uses two variable times $t_{V1}$, $t_{V2}$ to define the endpoints of the time interval that the lighting hub is presently examining. The lighting hub 140 uses the variable times $t_{V1}$, $t_{V2}$ to sequentially step through the events of the timeclock schedule, which are spaced apart by the minimum time period $T_{MIN}$ according to the second embodiment of the present invention. The lowest shade positions $P_{LOW}$ during the respective time intervals becomes the controlled shade positions $P_{CNTL}$(t) of the timeclock events, which have event times equal to the beginning of the respective time interval (i.e., the first variable time $t_{V1}$).

Referring to FIG. 10, the lighting hub 140 sets the first variable time $t_{V1}$ equal to the start time $t_{START}$ of the timeclock schedule at step 610. The lighting hub 140 also initializes a previous shade position $P_{PREV}$ to the nighttime position $P_{NIGHT}$ at step 610. If there is enough time left before the end time $t_{END}$ for the present timeclock event (i.e., if the first variable time $t_{V1}$ plus the minimum time period $T_{MIN}$ is not greater than the end time $t_{END}$) at step 612, the lighting hub 140 determines at step 614 if there is enough time for another timeclock event in the timeclock schedule after the present timeclock event. If the first variable time $t_{V1}$ plus two times the minimum time period $T_{MIN}$ is not greater than the end time $t_{END}$ at step 614, the lighting hub 140 sets the second variable time $t_{V2}$ equal to the first variable time $t_{V1}$ plus the minimum time period $T_{MIN}$ at step 616, such that the lighting hub 140 will then examine the time interval between the first and second variable times $t_{V1}$, $t_{V2}$. If the first variable time $t_{V1}$ plus two times the minimum time period $T_{MIN}$ is greater than the end time $t_{END}$ at step 614, the lighting hub 140 sets the second variable time $t_{V2}$ equal to the end time $t_{END}$ at step 618, such that the lighting hub 140 will then examine the time interval between the first variable time $t_{V1}$ and the end time $t_{END}$.

At step 620, the lighting hub 140 determines the lowest shade position $P_{LOW}$ of the optimal shade positions $P_{OPT}$(t) during the present time interval (i.e., between the first variable time $t_{V1}$ and the second variable time $t_{V2}$ determined at steps 616 and 618). If, at step 622, the previous shade position $P_{PREV}$ is not equal to the lowest shade position $P_{LOW}$ during the present time interval (as determined at step 620), the lighting hub 140 sets the controlled position $P_{CNTL}(t_{V1})$ at the first variable time $t_{V1}$ to be equal to the lowest shade position $P_{LOW}$ of the optimal shade positions $P_{OPT}$(t) during the present time interval at step 624. The lighting hub 140 then stores in memory a timeclock event having the event time $t_{V1}$ and the corresponding controlled position $P_{CNTL}(t_{V1})$ at step 626 and sets the previous shade position $P_{PREV}$ equal to the new controlled position $P_{CNTL}(t_{V1})$ at step 628. If, at step 622, the previous shade position $P_{PREV}$ is equal to the lowest shade position $P_{LOW}$ during the present time interval, the lighting hub 140 does not create a timeclock event at the first variable time $t_{V1}$. The lighting hub 140 then begins to examine the next time interval by setting the first variable time $t_{V1}$ equal to the second variable time $t_{V2}$ at step 630. The timeclock event creation procedure 600 loops around such that the lighting hub 140 determines if there is enough time left before the end time $t_{END}$ for the present timeclock event at step 612. If the first variable time $t_{V1}$ plus the minimum time period $T_{MIN}$ is greater than the end time $t_{END}$ at step 612, the lighting hub 140 enables the timeclock schedule at step 632 and the timeclock event creation procedure 600 exits.

Figure 12:
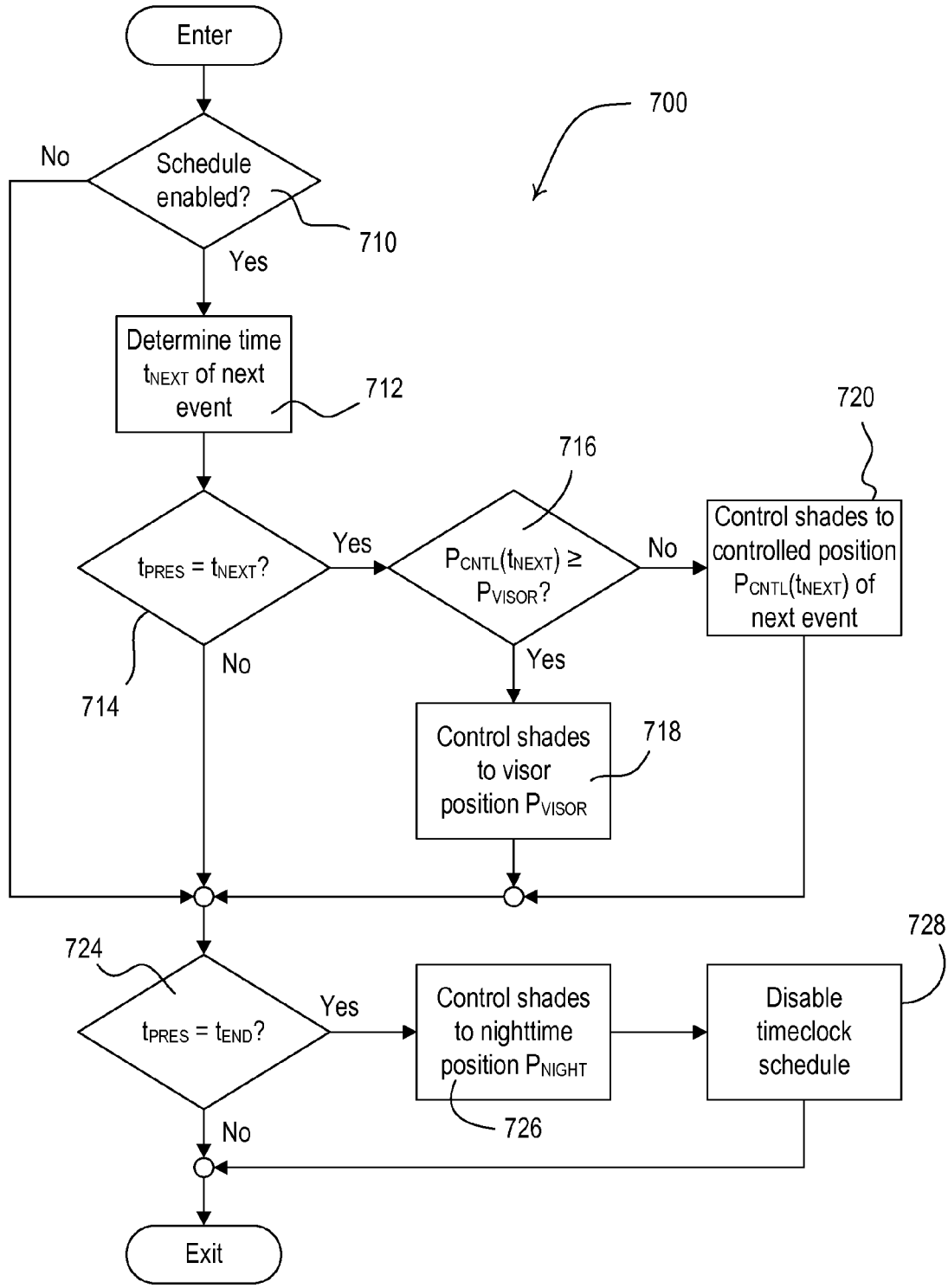
FIG. 12 is a simplified flowchart of a timeclock schedule execution procedure executed by the central controller of the load control system of FIG. 1 according to the second embodiment of the present invention.

FIG. 12 is a simplified flowchart of a timeclock schedule execution procedure 700, which is executed by the lighting hub 140 periodically, e.g., every minute between the start time $t_{START}$ and the end time $t_{END}$ of the timeclock schedule. Since there may be multiple timeclock schedules for the motorized roller shades 104 controlled by each of the lighting hubs 140, each lighting hub may execute the timeclock schedule execution procedure 700 multiple times, e.g., once for each timeclock schedule. During the timeclock schedule execution procedure 700, the lighting hub 140 adjusts the positions of the motorized roller shades 104 to the controlled positions $P_{CNTL}$(t) determined in the timeclock event creation procedure 600.

In some cases, when the lighting hub 140 controls the motorized roller shades 104 to the fully-open positions $P_{FO}$ (i.e., when there is no direct sunlight incident on the façade 164), the amount of daylight entering the space 160 may be unacceptable to a user of the space. Therefore, the lighting hub 140 is operable to set the open-limit positions of the motorized roller shades of one or more of the spaces 160 or façades 164 of the building 162 to a visor position $P_{VISOR}$, which is typically lower than the fully-open position $P_{FO}$, but may be equal to the fully-open position. Thus, the visor position $P_{VISOR}$ defines the highest position to which the motorized roller shades 104 will be controlled during the timeclock schedule. The position of the visor position $P_{VISOR}$ may be entered using the GUI software of the PC 150. In addition, the visor position $P_{VISOR}$ may be enabled and disabled for each of the spaces 160 or façades 164 of the building 162 using the GUI software of the PC 150. Since two adjacent windows 166 of the building 162 may have different heights, the visor positions $P_{VISOR}$ of the two windows may be programmed using the GUI software, such that the hembars 174 of the shade fabrics 172 covering the adjacent window are aligned when the motorized roller shades 104 are controlled to the visor positions $P_{VISOR}$.

Referring to FIG. 12, if the timeclock schedule is enabled at step 710, the lighting hub 140 determines the time $t_{NEXT}$ of the next timeclock event from the timeclock schedule at step 712. If the present time $t_{PRES}$ is equal to the next event time $t_{NEXT}$ at step 714 and the controlled position $P_{CNTL}(t_{NEXT})$ at the next event time $t_{NEXT}$ is greater than or equal to the visor position $P_{VISOR}$ at step 716, the lighting hub 140 adjusts the positions of the motorized roller shades 104 to the visor position $P_{VISOR}$ at the next event time $t_{NEXT}$ at step 718. Otherwise, the lighting hub 140 adjusts the positions of the motorized roller shades 104 to the controlled position $P_{CNTL}(t_{NEXT})$ at the next event time $t_{NEXT}$ at step 720. After adjusting the positions of the motorized roller shades 104 at steps 718, 720, after determining that there is not a timeclock event at the present time at step 714, or after determining that the timeclock schedule is not enabled at step 710, the lighting hub 140 makes a determination as to whether the present time is equal to the end time $t_{END}$ of the timeclock schedule at step 724. If not, the timeclock schedule execution procedure 700 simply exits. If the present time is equal to the end time $t_{END}$ at step 724, the lighting hub 140 controls the motorized roller shades 104 to the nighttime position $P_{NIGHT}$ at step 726 and disables the timeclock schedule at step 728, before the timeclock schedule execution procedure 700 exits.

Figure 13:
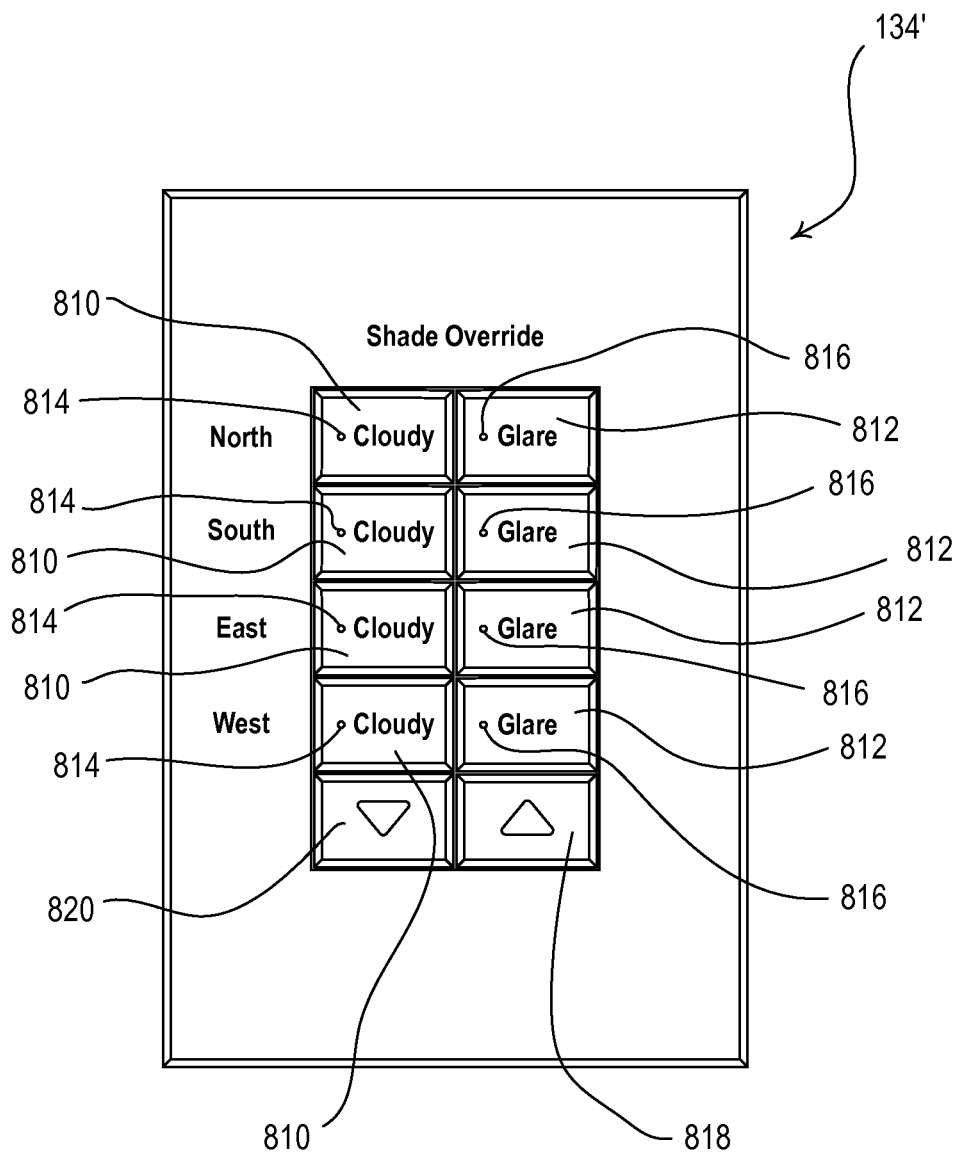
FIG. 13 is an example front view of the shade override wallstation of the load control system of FIG. 1.

The load control system 100 may also comprise a shade override wallstation 134' for allowing an occupant in the space 160 to manually adjust the positions of the motorized roller shades 104 and to temporarily override (i.e., disable) the execution of the timeclock schedule. FIG. 13 is an example front view of the shade override wallstation 134'. The shade override wallstation 134' comprises a plurality of "cloudy" buttons 810, e.g., one cloudy button for each of the four façades 164 of the building 162 (i.e., North, South, East, and West). The shade override wallstation 134' comprises, for each of the four façades 164 of the building 162, a respective "glare" button 812, which is positioned adjacent the corresponding cloudy button 810. The shade override wallstation 134' is coupled to the shade communication link 132 for transmitting digital messages to the connected lighting hub 140 in response to actuations of the cloudy buttons 810 and the glare buttons 812.

The cloudy buttons 810 may be actuated by the occupant on a cloudy day when the chances of sun glare occurring are minimal in order to allow more indirect daylight to enter the space 160. In response to an actuation of one of the cloudy buttons 810, the lighting hub 140 controls each of the motorized roller shades 104 located on the respective façade 164 to the fully-open position $P_{FO}$ (or the visor position $P_{VISOR}$). The lighting hub 140 also temporarily disables the timeclock schedule for the motorized roller shades 104 on the respective façade 164 in response to actuations of the cloudy buttons 810. The timeclock schedule may be disabled, for example, until the end time $t_{END}$ of the present timeclock schedule. Alternatively, the lighting hub 140 could disable the timeclock schedule for a predetermined override time period $T_{OVERRIDE}$, e.g., approximately two hours, in response to actuations of the cloudy buttons 810. The cloudy buttons 810 each comprise a cloudy-override visual indicator 814, which is illuminated when the respective cloudy button is actuated to disable the timeclock schedule and open the motorized window treatments 104 on the respective façade 164. If the timeclock schedule for one of the façades 164 is disabled and the respective cloudy button 810 is actuated, the timeclock schedule for the façade is enabled and the motorized roller shades 104 are adjusted so as to control the sunlight penetration distance $d_{PEN}$ in the space 160 (as described above). If the timeclock schedule is disabled at the end time $t_{END}$ of the present timeclock schedule, the timeclock schedule will be enabled when the timeclock configuration procedure 400 is next executed (e.g., at the beginning of the next day).

The glare buttons 812 may be actuated by the occupant when unexpected sun glare is occurring in the space 160, for example, due to sunlight being reflected off of another surface and onto the façade 164. In response to an actuation of one of the glare buttons 812, the lighting hub 140 controls the motorized roller shades 104 located on the respective façade 164 to the fully-closed positions $P_{FC}$. The lighting hub 140 also temporarily disables the timeclock schedule in response to actuations of the glare buttons 812, for example, until the end time $t_{END}$ of the present timeclock schedule or for the predetermined override time period $T_{OVERRIDE}$. The glare buttons 812 each comprise a glare-override visual indicator 816, which is illuminated when the respective glare button is actuated to disable the timeclock schedule for the motorized window treatments 104 on the respective façade 164. The timeclock schedule is enabled again when the respective glare button 812 is subsequently actuated or when the timeclock configuration procedure 400 is next executed.

The shade override wallstation 134' also comprises a raise override button 818 and lower override button 820, which allow for manual adjustment of the positions of the motorized window treatments for which the timeclock schedules have been disabled. When the raise override button 818 is actuated, the lighting hub 140 raises by a predetermined amount the positions of the motorized roller shades 104 for which the timeclock schedules have been disabled. When the lower override button 820 is actuated, the lighting hub 140 lowers by the predetermined amount the positions of the motorized roller shades 104 for which the timeclock schedules have been disabled. For example, if one of the glare buttons 812 is actuated to fully close the motorized roller shades 104 on a specific façade 164, the raise override button 818 may be actuated to slightly raise the motorized roller shades on the façade to allow some daylight to enter the space 160.

Figure 14:
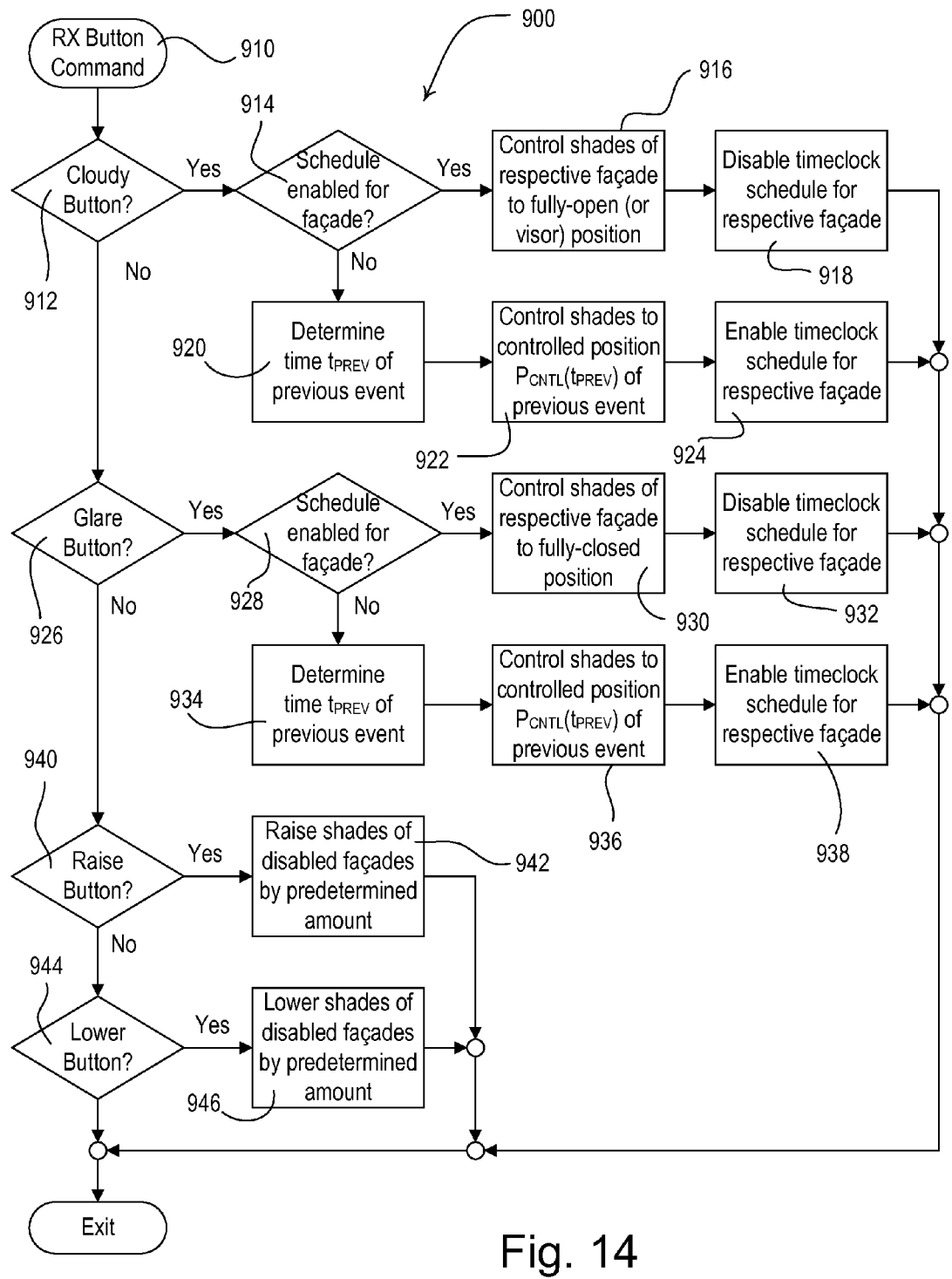
FIG. 14 is a simplified flowchart of a received command procedure executed by the central controller of the load control system of FIG. 1 in response to receiving a digital message from the shade override wallstation of FIG. 13.

FIG. 14 is a simplified flowchart of a received command procedure 900 executed by the lighting hub 140 in response to receiving a digital message from the shade override wallstation 134' via the shade communication link 132 at step 910. The lighting hub 140 determines at step 912 whether the received message includes a cloudy button command, which is transmitted in response to an actuation of one of the cloudy buttons 810 and includes information regarding which of the four façades to which the actuated cloudy button is associated. If the received message includes a cloudy button command at step 912 and the timeclock schedule is enabled for the corresponding façade at step 914, the lighting hub 140 controls all of the motorized roller shades 104 of the respective façade to the fully-open positions $P_{FO}$ (or the visor positions $P_{VISOR}$) at step 916. The lighting hub 140 then disables the timeclock schedule at step 918 and the received command procedure 900 exits. If the timeclock schedule is disabled for the corresponding façade at step 914, the lighting hub 140 determines the event time $t_{PREV}$ of the previous timeclock event at step 920 and adjusts the positions of the motorized roller shades 104 of the respective façade to the controlled position $P_{CNTL}(t_{PREV})$ at the previous event time at step 922. The lighting hub 140 then enables the timeclock schedule once again at step 924 and the received command procedure 900 exits.

If the received message does not include a cloudy button command at step 912, the lighting hub 104 determines at step 926 if the received message includes a glare button command, which is transmitted in response to an actuation of one of the glare buttons 812 and includes information regarding which of the four facades to which the actuated glare button is associated. If the received message includes a glare button command at step 926 and the timeclock schedule is enabled for the corresponding façade at step 928, the lighting hub 140 controls all of the motorized roller shades 104 of the respective façade to the fully-closed positions $P_{FC}$ at step 930. The lighting hub 140 then disables the timeclock schedule at step 932 and the received command procedure 900 exits. If the timeclock schedule is disabled for the corresponding façade at step 928, the lighting hub 140 determines the event time $t_{PREV}$ of the previous timeclock event at step 934 and adjusts the positions of the motorized roller shades 104 of the respective façade to the controlled position $P_{CNTL}(t_{PREV})$ at the previous event time at step 936. The lighting hub 140 then enables the timeclock schedule once again at step 938 and the received command procedure 900 exits.

If the received message does not include a glare button command at step 926, but includes a raise override button command (from an actuation of the raise override button 818)

at step 940, the lighting hub raises the positions of the motorized roller shades 104 on the façades 164 having disabled timeclock schedules by the predetermined amount at step 942, and the received command procedure 900 exits. If the received message includes a lower override button command (from the lower override button 820) at step 944, the lighting hub 140 lowers the positions of the motorized roller shades 104 on the façades 164 having disabled timeclock schedules by the predetermined amount at step 946, before the received command procedure 900 exits.

Alternatively, the lighting hubs 140 could receive shade override digital messages from sources other than the shade override wallstation 134'. For example, the GUI software of the PC 150 could provide a virtual shade override wallstation having buttons that may be selected by a user. The PC 150 could transmit a digital message to the lighting hubs 140 for overriding the execution of the timeclock schedules in response to the actuations of one of the buttons of the virtual shade override wallstation of the GUI software. In addition, the lighting hubs 140 could receive digital messages for overriding the execution of the timeclock schedules from other control systems, such as a building management system (BMS) coupled to the PC 150. Further, the lighting hubs 140 could override the execution of the timeclock schedules in response to digital messages received from other control devices of the load control system 100, for example, from a daylight sensor detecting a cloudy condition or a glare condition.

Therefore, the lighting hub 140 controls the motorized roller shades 104 according to the second embodiment of the present invention to limit the sunlight penetration distance $d_{PEN}$, while minimizing occupant distractions, by adjusting the motorized roller shades 104 at times that are spaced apart by multiples of the user-specified minimum time period $T_{MIN}$ between shade movements. Since the positions of all of the motorized roller shades 104 is the building 162 may only be adjusted at these specific times (i.e., at the multiples of the user-specified minimum time period $T_{MIN}$), the motorized roller shades 104 will all move at the same times during the timeclock schedule, thus minimizing occupant distractions. Even adjustments of adjacent motorized roller shades 104 located on different façades 164 (for example, in a corner office) will move at the same times (i.e., at the multiples of the user-specified minimum time period $T_{MIN}$). If the minimum time period $T_{MIN}$ between shade movements is chosen to be a logical time period (e.g., one hour), the users of the building will know when to expect movements of the motorized roller shades 104, and thus will not be as distracted by the shade movements as compared to shade movements occurring at random times. Alternatively, the GUI software of the PC 150 could allow the user to select the specific event times of the timeclock events (while ensuring that the minimum time period $T_{MIN}$ exists between consecutive timeclock events) in order to conform the timeclock schedule to a predetermined time schedule. For example, the event times of the timeclock schedule could be chosen according to a class schedule at a school building, such that the motorized roller shades 104 only move between the periods of the class schedule.

Since the timeclock configuration procedure 400 of the second embodiment of the present invention only requires a small number of inputs in order to automatically generate a timeclock schedule, the operation of the motorized roller shades 104 may be easily and quickly reconfigured using the GUI software of the PC 150. While the local longitude λ and latitude Φ of the building 162, the façade angle $\phi_F$ for a specific façade 164 of the building, the height $h_{WIN}$ of the window 166 in a specific space 160, and the height $h_{WORK}$ of the table 168 in the specific space of the building will not typically change after installation and configuration of the load control system 100, the user only needs to adjust the desired maximum sunlight penetration distance $d_{MAX}$ and the minimum time period $T_{MIN}$ between shade movements to adjust the operation of the motorized window shades 104 in the space occupied by the user. The GUI software of the PC 150 provides simple screens to allow for adjustment of the desired maximum sunlight penetration distance $d_{MAX}$ and the minimum time period $T_{MIN}$ between shade movements. After an adjustment of the desired maximum sunlight penetration distance $d_{MAX}$ and the minimum time period $T_{MIN}$ between shade movements, the PC 150 will transmit the new operational characteristics to the lighting hubs 140, and the lighting hubs will each generate a new timeclock schedule using the timeclock configuration procedure 400 and immediately begin operating based on the new timeclock schedule. The user can repetitively adjust the desired maximum sunlight penetration distance $d_{MAX}$ and the minimum time period $T_{MIN}$ between shade movements (i.e., use an iterative process) over the course of a few days in order to achieve the desired operation of the motorized roller shades 104 in the space.

According to the second embodiment of the present invention, the motorized roller shades 104 are controlled such that the hembars 174 (FIG. 2) of all of the motorized roller shades on one of the façades 164 of the building 162 are aligned (i.e., positioned at approximately the same vertical position) at all times during the timeclock schedule. Since all of the motorized roller shades 104 on a façade 164 are adjusted at the same time, the lighting hub 140 will calculate the same controlled position $P_{CNTL}(t)$ for all of the motorized roller shades on the façade at a specific event time (assuming that all of the motorized roller shades are controlled to limit the sunlight penetration distance $d_{PEN}$ to the same desired maximum sunlight penetration distance $d_{MAX}$). Therefore, the hembars 174 of the motorized roller shades 104 on a façade 164 will be aligned independent of differences in the size, shape, or height of the windows 166 of the façade 164.

According to a third embodiment of the present invention, the lighting hub 140 generates a timeclock schedule in response to a maximum number $N_{MAX}$ of movements of the motorized roller shades 104 that may occur during the present day, as well as in response to the minimum time period $T_{MIN}$ that may exist between any two consecutive movements of the motorized roller shades. As in the first two embodiments of the present invention, the timeclock schedule provides for control of the motorized roller shades 104 to limit the sunlight penetration distance $d_{PEN}$ to be less than the desired maximum sunlight penetration distance $d_{MAX}$. The desired maximum sunlight penetration distance $d_{MAX}$, the maximum number $N_{MAX}$ of roller shade movements, and the minimum time period $T_{MIN}$ between shade movements may be stored in the memory in the lighting hub 140 and may be entered by a user using the GUI software of the PC. For example, the maximum number $N_{MAX}$ of roller shade movements may have a minimum value of approximately three. Accordingly, the user is able to control the maximum number $N_{MAX}$ of roller shade movements and the minimum time period $T_{MIN}$ between shade movements in order to minimize distractions of an occupant in the space 160 due to roller shade movements. The user may select different values for the desired maximum sunlight penetration distance $d_{MAX}$, the maximum number $N_{MAX}$ of roller shade movements, and the minimum time period $T_{MIN}$ between shade movements for different areas and different groups of motorized roller shades 104 in the building 162.

Figure 15:
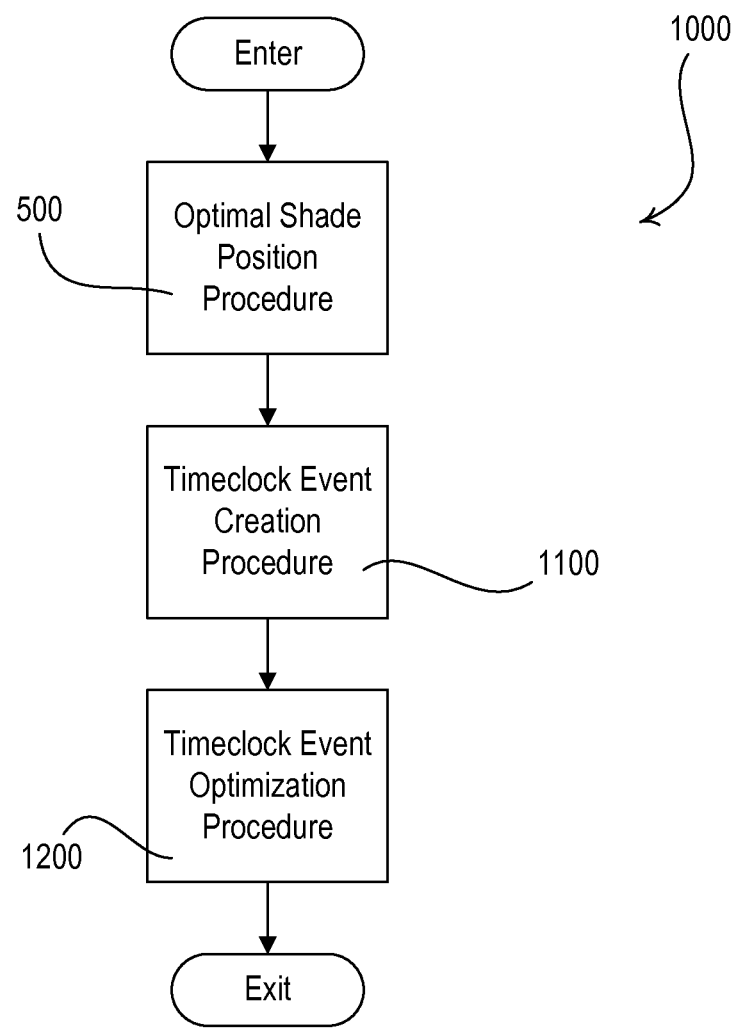
FIG. 15 is a simplified flowchart of a timeclock configuration procedure executed periodically by the central controller of the load control system of FIG. 1 according to a third embodiment of the present invention.

FIG. 15 is a simplified flowchart of a timeclock configuration procedure 1000 executed periodically by the lighting hub 140 of the load control system 100 (e.g., once each day at midnight) according to the third embodiment of the present invention. The timeclock configuration procedure 1000 is executed to generate a timeclock schedule defining the desired operation of the motorized roller shades 104 of each of the façades 164 of the building 162. During the timeclock configuration procedure 1000, the lighting hub 140 first performs the optimal shade position procedure 500 for determining the optimal shade positions $P_{OPT}(t)$ of the motorized roller shades 104 in response to the desired maximum sunlight penetration distance $d_{MAX}$ for each minute between the start time $t_{START}$ and the end time $t_{END}$ of the present day (as described above with reference to FIG. 8).

The lighting hub 140 then executes a timeclock event creation procedure 1100 to generate the events of the timeclock schedule in response to the optimal shade positions $P_{OPT}(t)$, the maximum number $N_{MAX}$ of roller shade movements, and the minimum time period $T_{MIN}$ between shade movements according to the third embodiment of the present invention. Referring to FIGS. 9A-9C, the plots of the optimal shade positions $P_{OPT1}(t)$, $P_{OPT2}(t)$, $P_{OPT3}(t)$ each include a different number of "flat regions" 550 and "movement regions" 555. A flat region is defined as a portion of a plot of the optimal shade positions $P_{OPT}(t)$ that does not change in position for at least the minimum time period $T_{MIN}$. A movement region is defined as a portion of a plot of the optimal shade positions $P_{OPT}(t)$ during which the position changes (e.g., between two flat regions 550). The lighting hub 140 analyzes the flat regions and the movement regions of the plots of the optimal shade positions $P_{OPT1}(t)$, $P_{OPT2}(t)$, $P_{OPT3}(t)$ in order to determine the event times of the timeclock schedule according to the third embodiment of the present invention. During the timeclock event creation procedure 1100, the lighting hub 140 generates controlled shade positions $P_{CNTL}(t)$, which comprise a number of discrete changes in the position of the motorized roller shades at the specific event times as in the second embodiment of the present invention.

Referring back to FIG. 15, the lighting hub 140 concludes by executing a timeclock event optimization procedure 1200 to optimize the operation of the timeclock schedule by eliminating unnecessary timeclock events. The events of the resulting timeclock schedule may occur at any time between the start time $t_{START}$ and the end time $t_{END}$ as long as two consecutive events do not occur within the minimum time period $T_{MIN}$ and the number of timeclock events does not exceed the maximum number $N_{MAX}$ of roller shade movements. The controlled shade positions $P_{CNTL}(t)$ of the resulting timeclock schedule are used by the lighting hub 140 to adjust the position of the motorized roller shades during the timeclock schedule execution procedure 700 (as shown in FIG. 12).

Figure 18A:
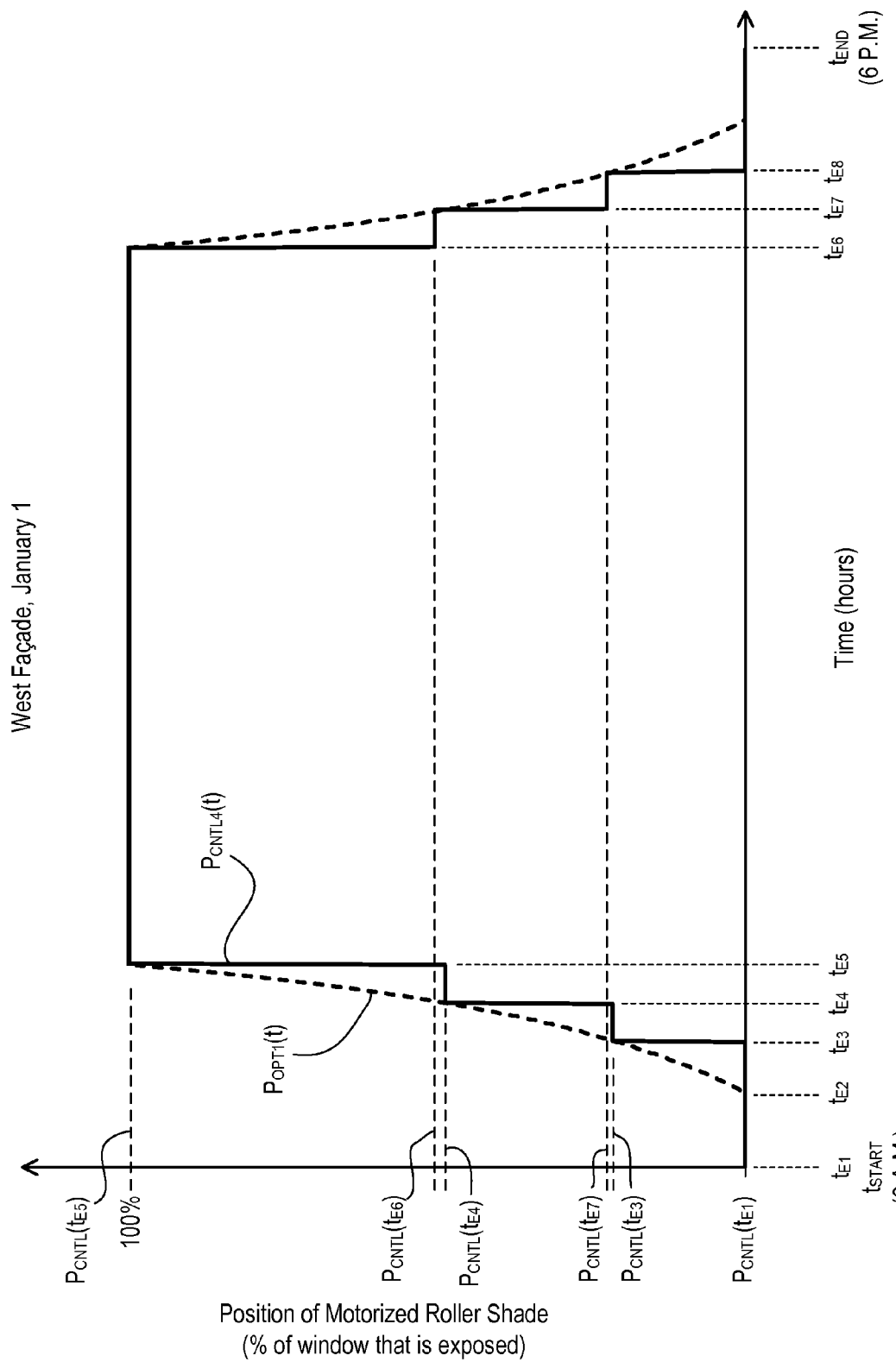
FIGS. 18A-18C show example plots of controlled shade positions of the motorized roller shades of the load control system of FIG. 1 on different facades of the building during different days of the year according to the third embodiment of the present invention.
Figure 18B:
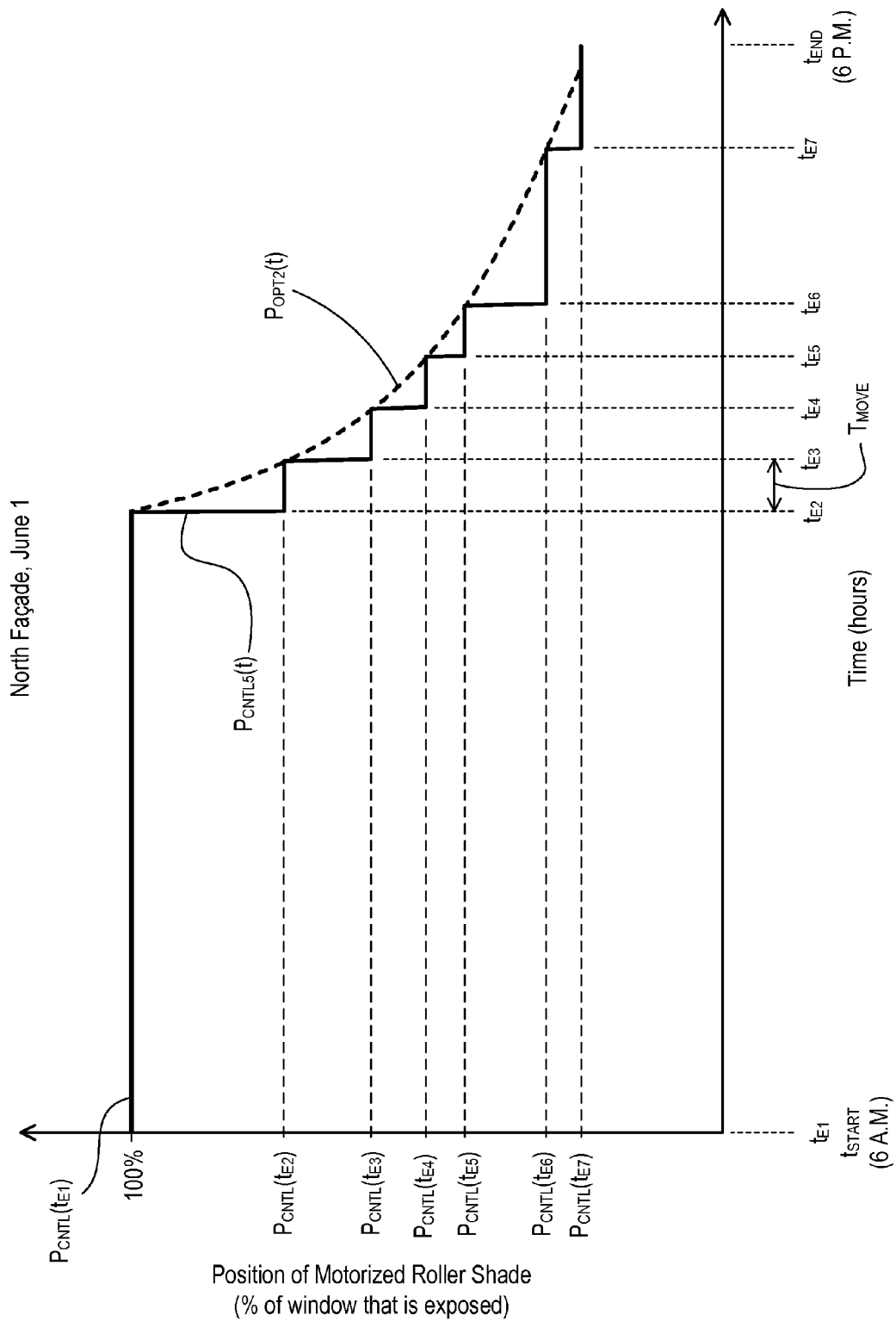
Figure 18C:
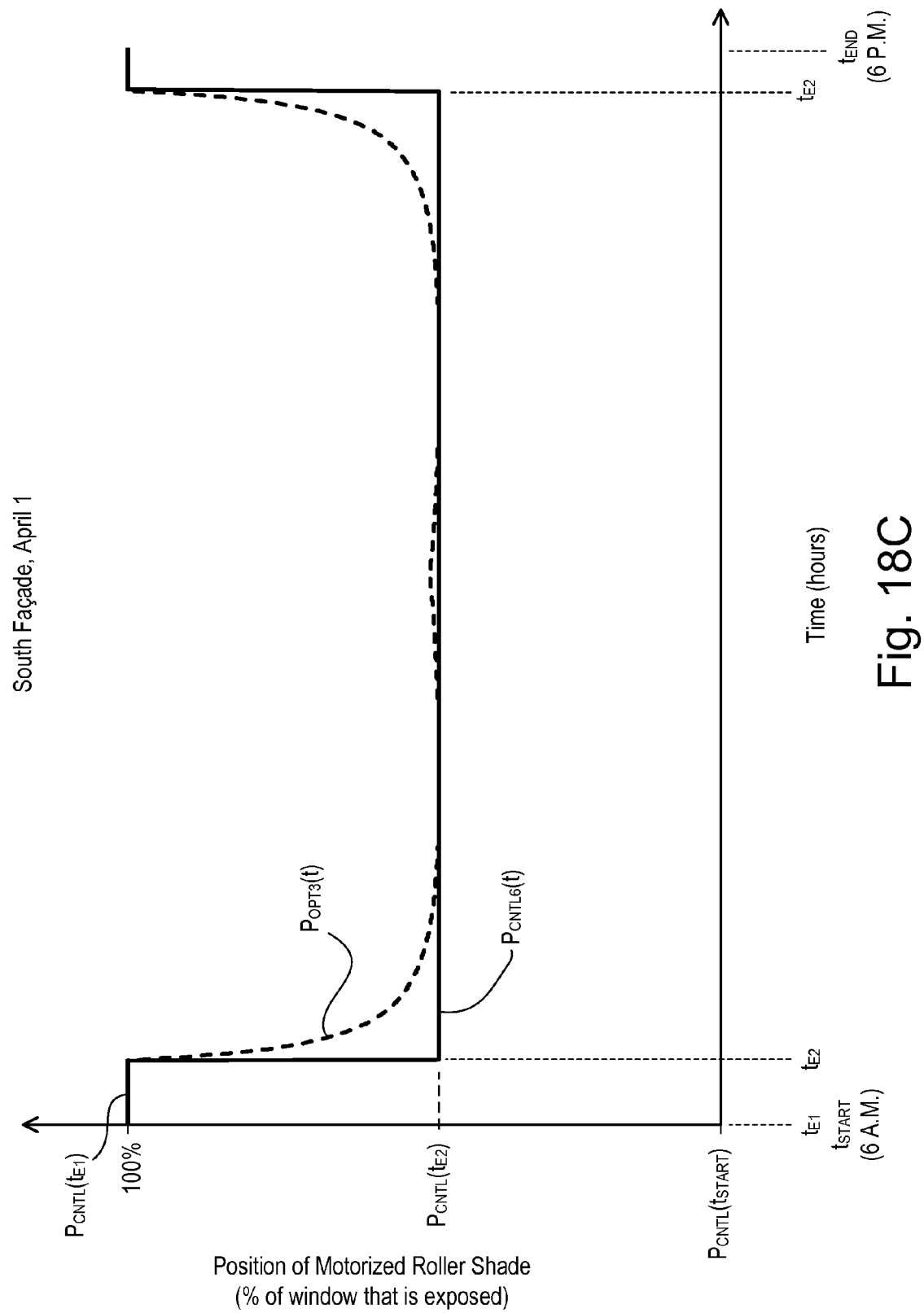

FIG. 18A shows an example plot of controlled shade positions $P_{CNTL4}(t)$ of the motorized roller shades 104 on the west façade of the building 162 on January 1 according to the third embodiment of the present invention. FIG. 18B shows an example plot of controlled shade positions $P_{CNTL5}(t)$ of the motorized roller shades 104 on the north façade of the building 162 on June 1 according to the third embodiment of the present invention. FIG. 18C shows an example plot of controlled shade positions $P_{CNTL6}(t)$ of the motorized roller shades 104 on the south façade of the building 162 on April 1 according to the third embodiment of the present invention.

Figure 16A:
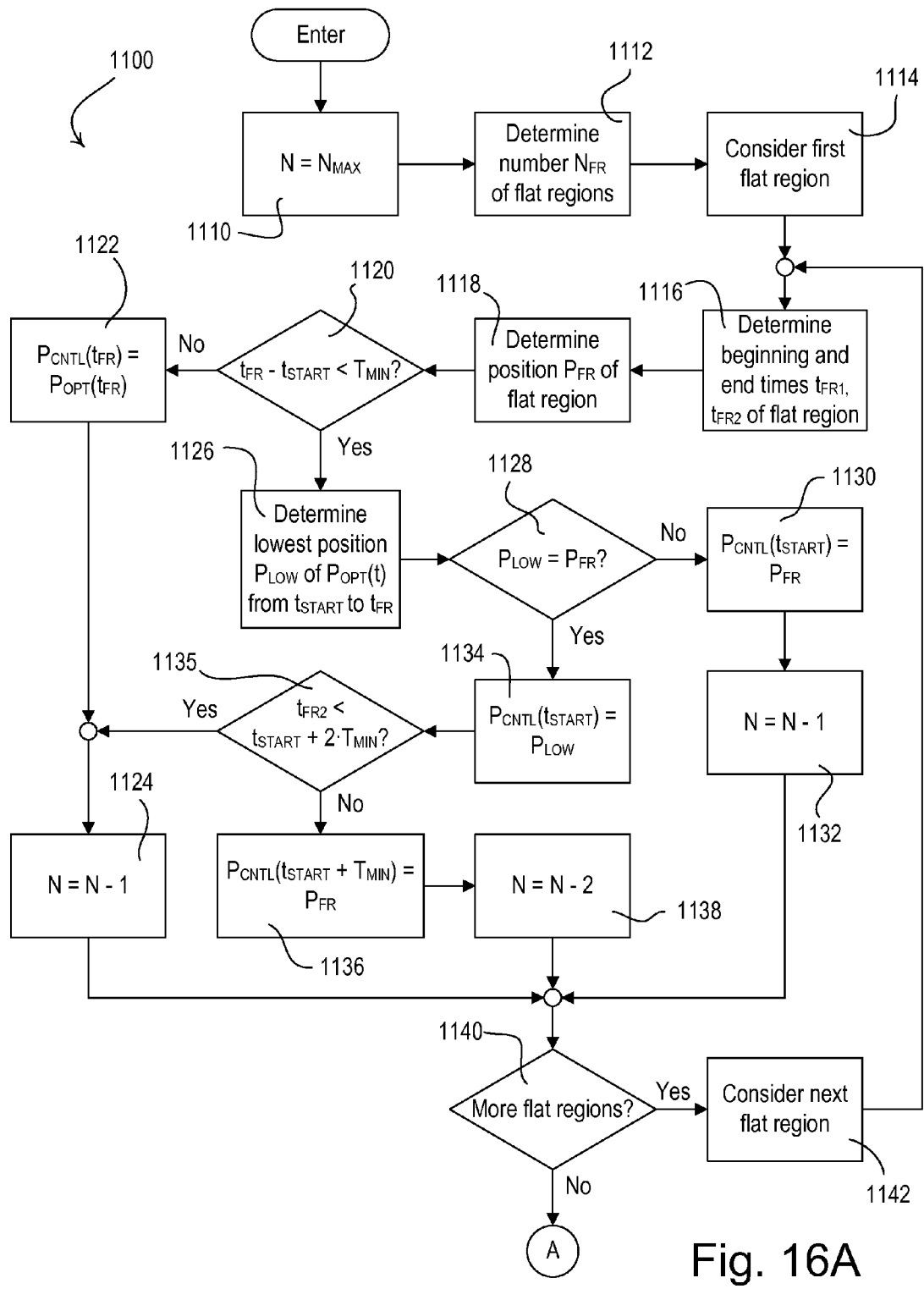
FIGS. 16A-16C are simplified flowcharts of a timeclock event optimization procedure executed by the central controller of the load control system of FIG. 1 according to the third embodiment of the present invention.
Figure 16B:
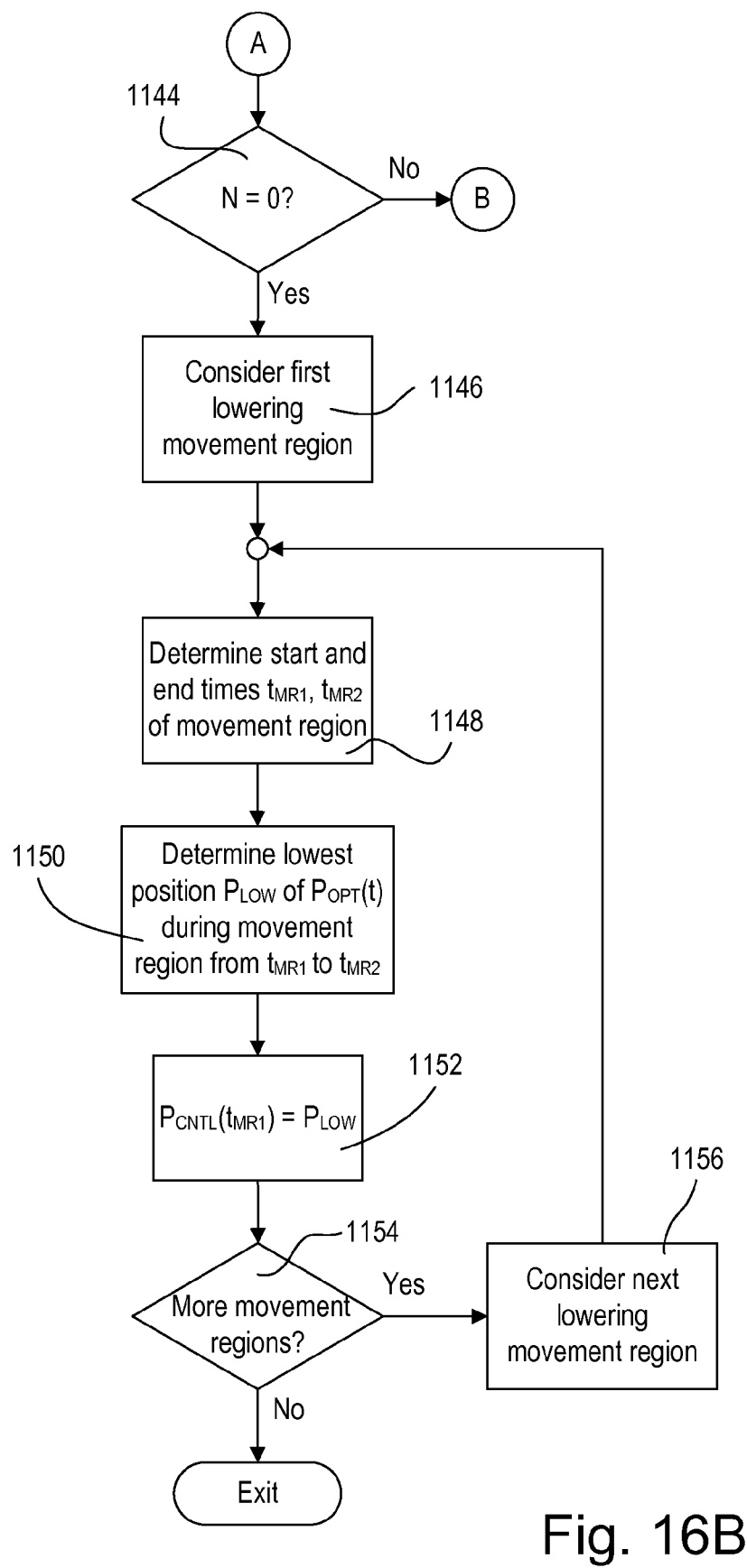
Figure 16C:
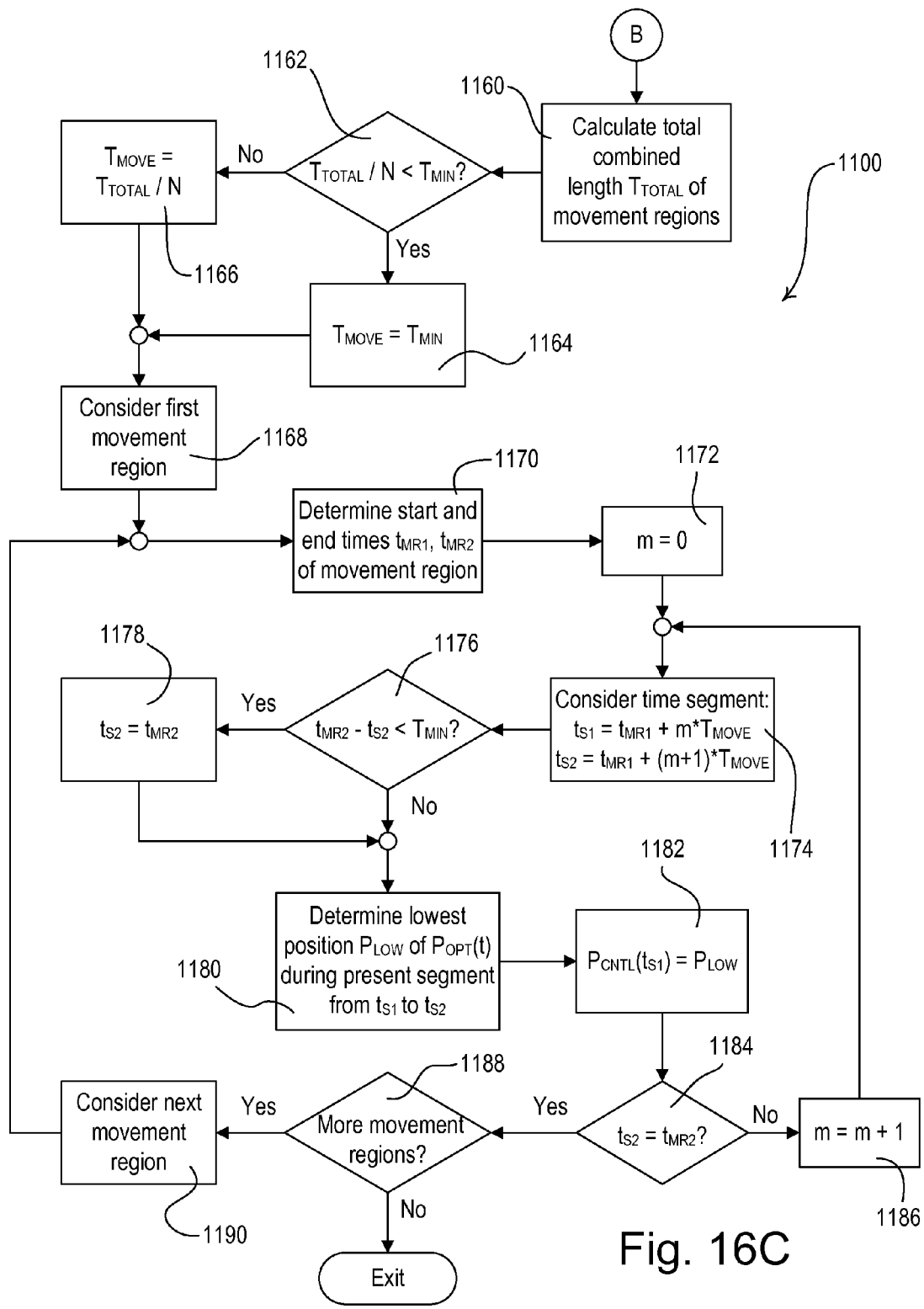

FIGS. 16A-16C are simplified flowcharts of the timeclock event creation procedure 1100, which is executed by the lighting hub 140 in order to generate the events of the timeclock schedule according to the third embodiment of the present invention. The lighting hub 140 first sets a variable N equal to the maximum number $N_{MAX}$ of roller shade movements at step 1110. The lighting hub 140 uses the variable N to keep track of how many more timeclock events may be generated without exceeding the maximum number $N_{MAX}$. The lighting hub 140 determines the number $N_{FR}$ of flat regions of the optimal shade positions $P_{OPT}(t)$ between the start time $t_{START}$ and the end time $t_{END}$ at step 1112, and then generates timeclock events at the beginning of each of the flat regions. The lighting hub 140 begins by considering the first flat region at step 1114, before determining the beginning time $t_{FR1}$ and the end time $t_{FR2}$ of the first flat region at step 1116 and determining the constant shade position $P_{FR}$ associated with the first flat region at step 1118. If the first flat region does not begin less than the minimum time period $T_{MIN}$ after the start time $t_{START}$ (i.e., if $t_{FR1}-t_{START} \geq T_{MIN}$) at step 1120, the lighting hub 140 generates an event at the beginning of the flat region at step 1122. Specifically, the lighting hub 140 sets the controlled shade position $P_{CNTL}(t_{FR1})$ at the beginning time $t_{FR1}$ of the first flat region to be equal to the optimal shade position $P_{OPT}(t_{FR1})$ at the beginning time $t_{FR1}$ at step 1122 and decrements the variable N by one at step 1124 (e.g., as shown at time $t_{E1}$ in FIG. 18C).

If the first flat region begins less than the minimum time period $T_{MIN}$ after the start time $t_{START}$ (i.e., if $t_{FR1}-t_{START}<T_{MIN}$) at step 1120, the lighting hub 140 determines the lowest shade position $P_{LOW}$ of the optimal shade position $P_{OPT}(t_{START})$ between the start time $t_{START}$ of the timeclock schedule and the beginning time $t_{FR1}$ of the flat region at step 1126. If the lowest shade position $P_{LOW}$ is equal to the constant shade position $P_{FR}$ of the flat region at step 1128 (i.e., if the plot of the optimal shade positions $P_{OPT}(t)$ is moving downward at the start time $t_{START}$), the lighting hub 140 sets the controlled shade position $P_{CNTL}(t_{START})$ at the start time $t_{START}$ of the timeclock schedule to be equal to the constant shade position $P_{FR}$ of the flat region at step 1130 and decrements the variable N by one at step 1132. If the lowest shade position $P_{LOW}$ is not equal to the constant shade position $P_{FR}$ of the flat region at step 1128 (i.e., if the plot of the optimal shade positions $P_{OPT}(t)$ is moving upward at the start time $t_{START}$), the lighting hub 140 sets the controlled shade position $P_{CNTL}(t_{START})$ at the start time $t_{START}$ of the timeclock schedule to be equal to the lowest shade position $P_{LOW}$ at step 1134. If the present flat region is too small to create another timeclock event before the end time $t_{FR2}$ of the flat region (i.e., if $t_{FR2}<t_{START}+2 \cdot T_{MIN}$) at step 1135, the lighting hub 140 simply decrements the variable N by one at step 1124.

However, if the present flat region is long enough to create another timeclock event before the end time $t_{FR2}$ of the flat region (i.e., if $t_{FR2}<t_{START}+2 \cdot T_{MIN}$) at step 1135, the lighting hub 140 sets the controlled shade position $P_{CNTL}(t_{START}+T_{MIN})$ to be equal to the constant shade position $P_{FR}$ of the flat region at a time that is the minimum time period $T_{MIN}$ after the start time $t_{START}$ (i.e., $t_{START}+T_{MIN}$) at step 1136, and decrements the variable N by two at step 1138. After generating timeclock events at steps 1122, 1130, 1134, 1136, the lighting hub 140 determines if there are more flat regions to consider at step 1140. If so, the lighting hub 140 considers the next flat region at step 1142, before determining the beginning time $t_{FR1}$ of the next flat region at step 1116, determining the constant shade position $P_{FR}$ associated with the next flat region at step 1118, and generating appropriate timeclock events at steps 1122, 1130, 1134, 1136.

Referring to FIG. 16B, if there are not more flat regions to consider at step 1140, and the variable N is equal to zero at step 1144 (i.e., the number of events generated so far is equal to the maximum number $N_{MAX}$ of roller shade movements), the lighting hub 140 determines if there should be one or more timeclock events during the movement regions (rather than those timeclock events created for the flat regions at steps 1122, 1130, 1134, 1136). Specifically, the lighting hub 140 considers the first lowering movement regions (i.e., a movement region during which the position of the motorized roller shade 104 is moving towards 0%) at step 1146, and determines the start time $t_{MR1}$ and the end time $t_{MR2}$ of the first lowering movement region at step 1148. Next, the lighting hub 140 determines the lowest shade position $P_{LOW}$ of the optimal shade positions $P_{OPT}(t)$ during the present lowering movement region (i.e., between the time $t_{MR1}$ and the time $t_{MR2}$) at step 1150. At step 1152, the lighting hub 140 then sets the controlled shade position $P_{CNTL}(t_{MR1})$ at the beginning time $t_{MR1}$ of the present movement region to be equal to the lowest shade position $P_{LOW}$ of the optimal shade positions $P_{OPT}(t)$ during the present lowering movement region as determined in step 1150 (e.g., as shown at time $t_{E6}$ in FIG. 18A). If there are more lowering movement regions to consider at step 1154, the lighting hub 140 considers the next lowering movement region at step 1156, and the timeclock event creation procedure 1100 loops around, to create a timeclock event for the next lowering movement region. If there are not more lowering movement regions to consider at step 1154, the timeclock event creation procedure 1100 exits.

Referring to FIG. 16C, if the variable N is not equal to zero at step 1144 (i.e., the number of events generated so far is greater than the maximum number $N_{MAX}$ of roller shade movements), the lighting hub 140 generates timeclock events during the movement regions of the optimal shade positions $P_{OPT}(t)$. At step 1160, the lighting hub 140 calculates the total combined length $T_{TOTAL}$ of the movement regions. Next, the lighting hub 140 determines if the user-selected maximum number $N_{MAX}$ of roller shade movements or the user-selected minimum time period $T_{MIN}$ between shade movements is the limiting factor for determining a movement time $T_{MOVE}$, which will exist between the timeclock schedule events during the movement regions (e.g., as shown in FIG. 18B). Specifically, if the total combined length $T_{TOTAL}$ of the movement regions divided by the variable N (i.e., the number of remaining possible shade movements) is less than the minimum time period $T_{MIN}$ at step 1162, the minimum time period $T_{MIN}$ is the limiting factor and thus the lighting hub 140 sets the movement time $T_{MOVE}$ equal to the minimum time period $T_{MIN}$ at step 1164. If the total combined length $T_{TOTAL}$ of the movement regions divided by the variable N is not less than the minimum time period $T_{MIN}$ at step 1162, the number of remaining possible shade movements (i.e., the variable N) is the limiting factor and thus the lighting hub 140 sets the movement time $T_{MOVE}$ equal to the total combined length $T_{TOTAL}$ of the movement regions divided by the variable N at step 1166.

Next, the lighting hub 140 now generates timeclock events during the movement regions of the optimal shade positions $P_{OPT}(t)$. The lighting hub 140 considers the first movement region at step 1168, determines the start time $t_{MR1}$ and the end time $t_{MR2}$ of the first movement region at step 1170, and sets a variable m to zero at step 1172. At step 1174, the lighting hub 140 considers a time segment that begins at a time $t_{S1}$ and ends at a time $t_{S2}$ as defined by:

$$t_{S1} = t_{MR1} + m \cdot T_{MOVE}; \text{ and} \quad \text{(Equation 13)}$$

$$t_{S2} = t_{MR1} + (m+1) \cdot T_{MOVE}. \quad \text{(Equation 14)}$$

If the time $t_{S2}$ of the present time segment is within the minimum time period $T_{MIN}$ of the end time $t_{MR2}$ of the present movement region at step 1176 (i.e., $t_{MR2} - t_{S2} < T_{MIN}$), a timeclock event will not be generated between the time $t_{S2}$ of the present time segment and the end time $t_{MR2}$ of the present movement region. Therefore, the lighting hub 140 sets the time $t_{S2}$ of the present time segment equal to the end time $t_{MR2}$ of the present movement region at step 1178.

Next, the lighting hub 140 determines the lowest shade position $P_{LOW}$ of the optimal shade positions $P_{OPT}(t)$ during the present time segment (i.e., between the time $t_{S1}$ and the time $t_{S2}$) at step 1180. At step 1182, the lighting hub 140 then sets the controlled shade position $P_{CNTL}(t_{S1})$ at the time $t_{S1}$ to be equal to the lowest shade position $P_{LOW}$ of the optimal shade positions $P_{OPT}(t)$ during the present time segment as determined in step 1180 (e.g., as shown at time $t_{E2}$ in FIG. 18B). If the time $t_{S2}$ of the present time segment is not equal to the end time $t_{MR2}$ of the present movement region at step 1184, the lighting hub 140 increments the variable m at step 1186, considers the next time segment at step 1174, and generates a new timeclock event at step 1182. However, if the time $t_{S2}$ of the present time segment is equal to the end time $t_{MR2}$ of the present movement region at step 1184 and there are more movement regions to consider at step 1188, the lighting hub 140 considers the next movement region at step 1190, and the timeclock event creation procedure 1100 loops around, such that the lighting hub 140 generates the timeclock events for the next movement region. If there are not more movement regions to consider at step 1188, the timeclock event creation procedure 1100 exits.

Figure 17:
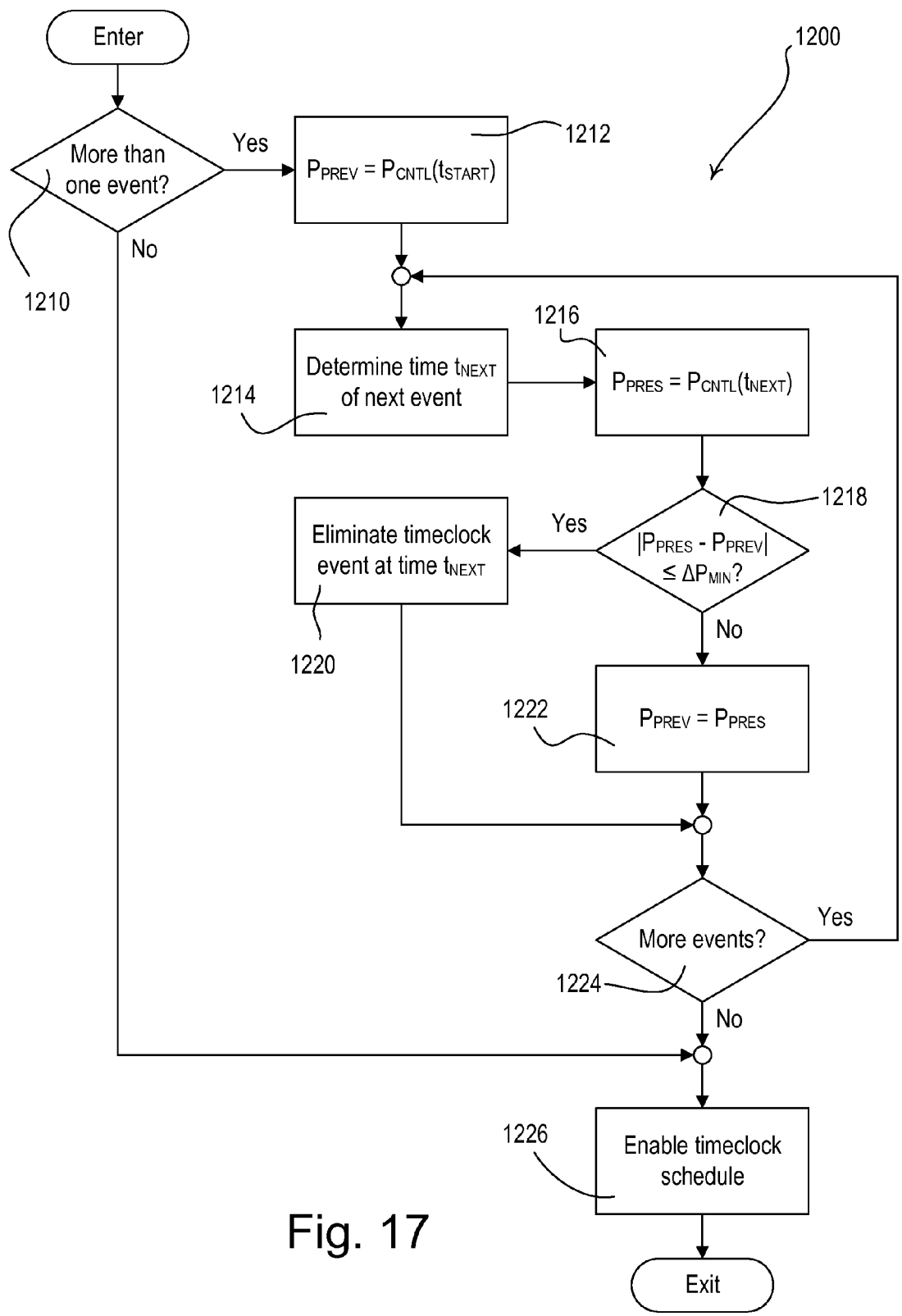
FIG. 17 is a simplified flowchart of the timeclock event optimization procedure executed by the central controller of the load control system of FIG. 1 according to the third embodiment of the present invention.

FIG. 17 is a simplified flowchart of the timeclock event optimization procedure 700, which is executed by the lighting hub 140 in order to optimize the operation of the timeclock schedule by eliminating unnecessary timeclock events. If there is more than one event in the timeclock schedule at step 1210, the lighting hub 140 first sets a previous position variable $P_{PREV}$ to be equal to the controlled shade position $P_{CNTL}(t_{START})$ at the start time $t_{START}$ at step 1212. The lighting hub 140 then determines a next event time $t_{NEXT}$ of the timeclock schedule at step 1214, and sets a present position variable $P_{PRES}$ equal to the controlled shade position $P_{CNTL}(t_{NEXT})$ at the next event time $t_{NEXT}$ at step 1216. If the present position variable $P_{PRES}$ is within a minimum shade position distance $\Delta P_{MIN}$ (e.g., 5%) of the previous position variable $P_{PREV}$ at step 1218, the lighting hub 140 eliminates the present event at time $t_{NEXT}$ at step 1220. For example, the events at times $t_{E2}$ and $t_{E6}$ of the controlled shade position $P_{CNTL1}(t)$ in FIG. 18A would be eliminated. If the present position variable $P_{PRES}$ is greater than the minimum shade position distance $\Delta P_{MIN}$ away from the previous position variable $P_{PREV}$ at step 1218, the lighting hub 140 keeps the present event at time $t_{NEXT}$ and sets the previous position variable $P_{PREV}$ equal to the present position variable $P_{PRES}$ at step 1222. If there are more events in the timeclock schedule at step 1224, the lighting hub 140 determines the next event time $t_{NEXT}$ of the timeclock schedule at step 1214, sets the present position variable $P_{PRES}$ equal to the controlled shade position $P_{CNTL}(t_{NEXT})$ at the next event time $t_{NEXT}$ at step 1216, before determining whether the present event should be eliminated at step 1218. If there are not more events in the timeclock schedule at step 1224, the lighting hub 140 enables the timeclock schedule at step 1226 and the timeclock event optimization procedure 1200 exits.

Alternatively, the lighting hub 140 may not generate a timeclock schedule prior to controlling the motorized roller shade 104 during normal operation in order to prevent the sunlight penetration distance $d_{PEN}$ from exceeding the desired maximum sunlight penetration distance $d_{MAX}$ while minimizing user distractions. According to a fourth embodiment of the present invention, the lighting hub 140 calculates the positions to which to control the motorized roller shades 104 "on-the-fly", i.e., immediately before adjusting the positions of the motorized roller shades 104. The lighting hub 140 adjusts the positions of the motorized roller shades 104 periodically, e.g., at times spaced apart by multiples of the minimum time period $T_{MIN}$ that may exist between any two consecutive movements of the motorized roller shades. Accordingly, the lighting hub 140 controls the positions of the motorized roller shades 104 to positions similar to the controlled shade positions $P_{CNTL1}(t)$, $P_{CNTL2}(t)$, $P_{CNTL3}(t)$ of the second embodiment of the present invention (as shown in FIGS. 11A-11C).

Figure 19:
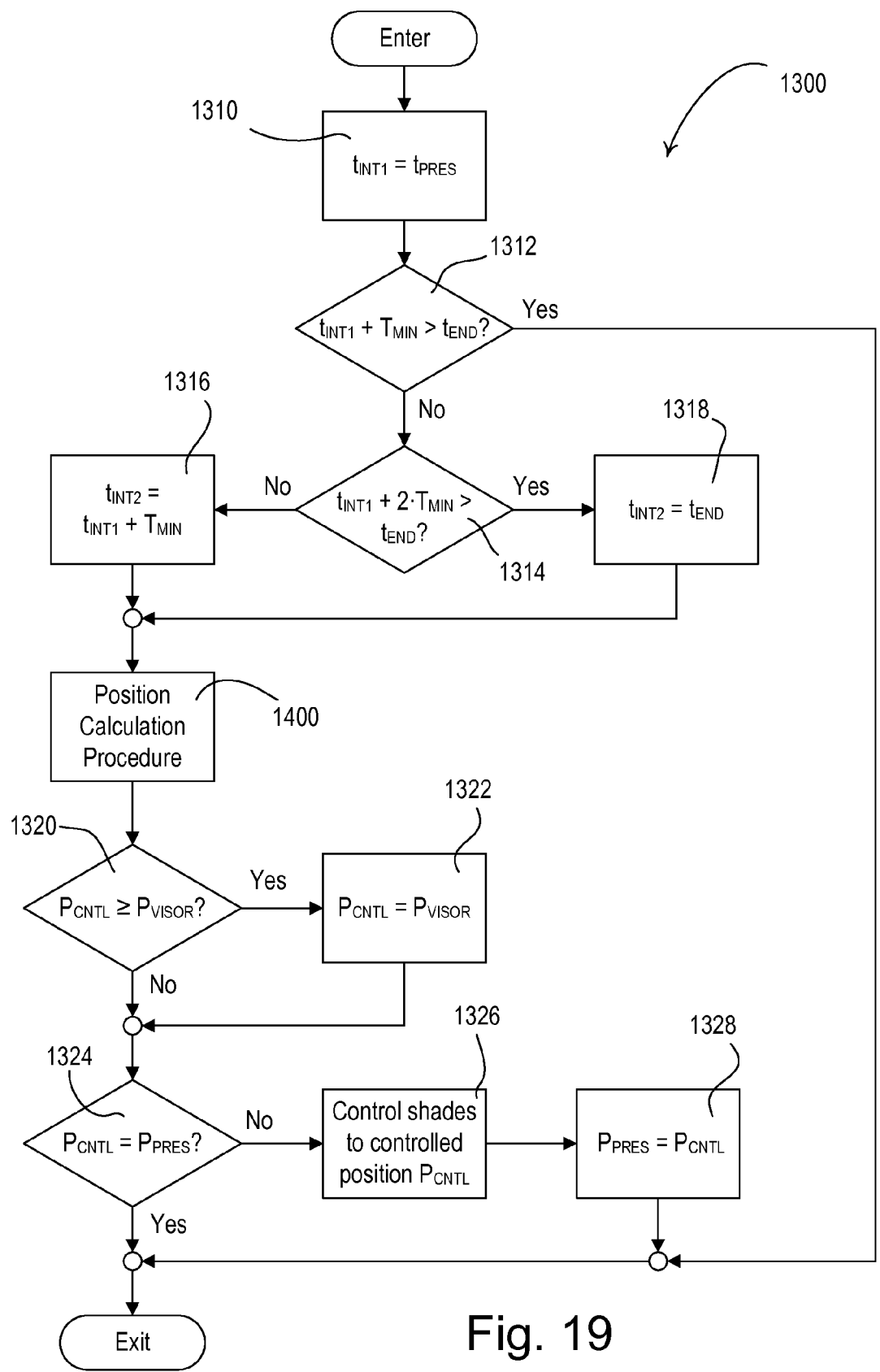
FIG. 19 is a simplified flowchart of a shade control procedure executed by the central controller of the load control system of FIG. 1 according to a fourth embodiment of the present invention.

FIG. 19 is a simplified flowchart of a shade control procedure 1300 executed by the lighting hub 140 according to the fourth embodiment of the present invention. The shade control procedure 1300 is executed periodically between a shade control start time $t_{START}$ and a shade control end time $t_{END}$, such that movements of the motorized roller shades 104 are spaced apart by at least the user-specified minimum time period $T_{MIN}$ between shade movements. For example, if the shade control start time $t_{START}$ is 6 A.M., the shade control end time $t_{END}$ is 6 P.M., and the minimum time period $T_{MIN}$ between shade movements is one hour, the shade control procedure 1300 will be executed once every hour on the hour between 6 A.M. and 6 P.M.

Referring to FIG. 19, the lighting hub 140 sets an interval start time $t_{INT1}$ equal to the present time $t_{PRES}$ at step 1310. If there is presently not enough time for another move before the shade control end time $t_{END}$ (i.e., if the interval start time $t_{INT1}$ plus the minimum time period $T_{MIN}$ between shade movements is greater than the shade control end time $t_{END}$) at step 1312, the shade control procedure 1300 simply exits. Otherwise, the lighting hub 140 determines an interval end time $t_{INT2}$ that represents the end of the next time interval over which the lighting hub will calculate the position to which the motorized roller shades should be controlled. Specifically, if there is enough room for another movement of the motorized roller shades 104 after the present movement (i.e., if interval start time $t_{INT1}$ plus two times the minimum time period $T_{MIN}$ between shade movements is not greater than the shade control end time $t_{END}$) at step 1314, the lighting hub 140 sets the interval end time $t_{INT2}$ equal to the interval start time $t_{INT1}$ plus the minimum time period $T_{MIN}$ between shade movements at step 1316. If there is not enough room for another movement of the motorized roller shades 104 after the present movement at step 1314, the lighting hub 140 sets the interval end time $t_{INT2}$ equal to the shade control end time $t_{END}$ at step 1318.

Next, the lighting hub 140 executes a position calculation procedure 1400 (which will be described in greater detail below with reference to FIG. 20) in order to determine a controlled position $P_{CNTL}$ for adjusting the positions of the motorized roller shades 104. If the controlled position $P_{CNTL}$ is greater than or equal to the visor position $P_{VISOR}$ at step 1320, the lighting hub 140 sets the controlled position $P_{CNTL}$ equal to the visor position $P_{VISOR}$ at step 1322. If the controlled position is equal to the present position $P_{PRES}$ at step 1324, the shade control procedure 1300 exits without adjusting the position of the motorized roller shades 104. If the controlled position $P_{CNTL}$ is not equal to the present position $P_{PRES}$ at step 1324, the lighting hub 140 adjusts the positions of the motorized roller shades 104 to the controlled position $P_{CNTL}$ at step 1326 and sets the present position $P_{PRES}$ equal to the controlled position $P_{CNTL}$ at step 1328, before the shade control procedure 1300 exits.

Figure 20:
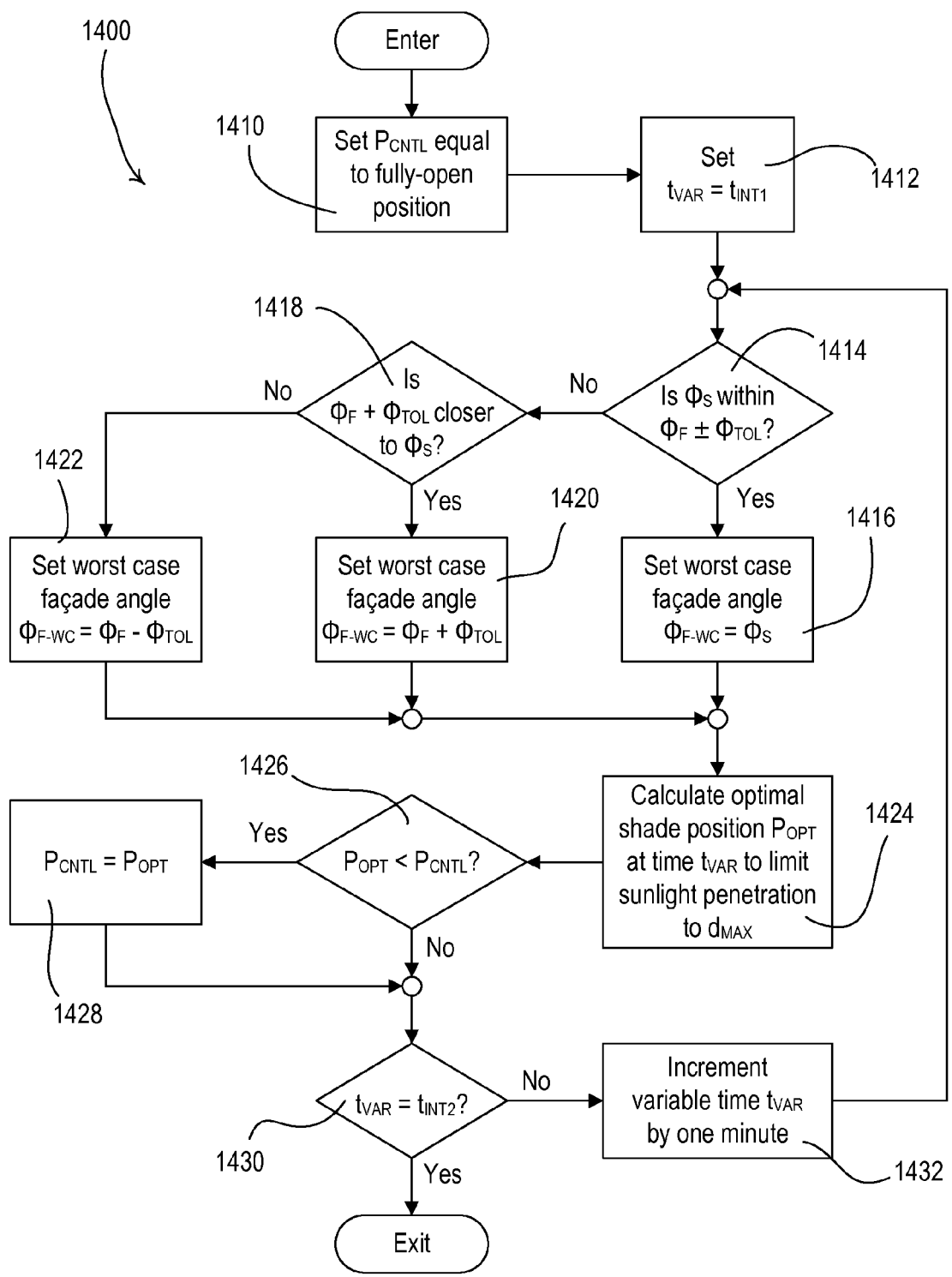
FIG. 20 is a simplified flowchart of a position calculation procedure executed by the central controller of the load control system of FIG. 1 according to the fourth embodiment of the present invention.

FIG. 20 is a simplified flowchart of the position calculation procedure 1400, which is executed periodically by the lighting hub 140 whenever the shade control procedure 1300 is executed, i.e., immediately before the lighting hub adjusts the positions of the motorized roller shades 104. During the position calculation procedure 1400, the lighting hub 140 calculates an optimal shade position $P_{OPT}$ of the motorized roller shades 104 to limit the sunlight penetration distance $d_{PEN}$ to the desired maximum sunlight penetration distance $d_{MAX}$ at each minute during the present time interval (i.e., between the interval start time $t_{INT1}$ and the interval end time $t_{INT2}$ determined during the shade control procedure 1300). The lighting hub 140 sets the controlled position $P_{CNTL}$ equal to the lowest one of the calculated optimal shade positions $P_{OPT}$. Referring to FIG. 20, the lighting hub 140 first sets a controlled position $P_{CNTL}$ to a default position, e.g., the fully-open position $P_{FO}$, at step 1410, and sets a variable time $t_{VAR}$ equal to the interval start time $t_{INT1}$ at step 1412.

Next, the lighting hub 140 determines the worst-case façade angle $\phi_{F-WC}$ to use to calculate an optimal position $P_{OPT}$ of the motorized roller shades 104 at the variable time $t_{VAR}$. The purpose of using the worst-case façade angle $\phi_{F-WC}$ is to account for human error that may occur when determining the façade angle $\phi_F$ of the façade 164. Specifically, if the solar azimuth angle $\phi_S$ is within a façade angle tolerance $\phi_{TOL}$ (e.g., approximately 3°) of the façade angle $\phi_F$ at step 1414 (i.e., if $\phi_F - \phi_{TOL} \leq \phi_S \leq \phi_F + \phi_{TOL}$), the lighting hub 140 sets the worst case façade angle $\phi_{F-WC}$ equal to the solar azimuth angle $\phi_S$ of the façade 164 at step 1416. If the solar azimuth angle $\phi_S$ is not within the façade angle tolerance $\phi_{TOL}$ of the façade angle $\phi_F$ at step 1414, the lighting hub 140 then determines if the façade angle $\phi_F$ plus the façade angle tolerance $\phi_{TOL}$ is closer to the solar azimuth angle $\phi_S$ than the façade angle $\phi_F$ minus the façade angle tolerance $\phi_{TOL}$ at step 1418. If so, the lighting hub 140 sets the worst case façade angle $\phi_{F-WC}$ equal to the façade angle $\phi_F$ plus the façade angle tolerance $\phi_{TOL}$ at step 1420. If the façade angle $\phi_F$ plus the façade angle tolerance $\phi_{TOL}$ is not closer to the solar azimuth angle $\phi_S$ than the façade angle $\phi_F$ minus the façade angle tolerance $\phi_{TOL}$ at step 1418, the lighting hub 140 sets the worst case façade angle $\phi_{F-WC}$ equal to the façade angle $\phi_F$ minus the façade angle tolerance $\phi_{TOL}$ at step 1422.

At step 1424, the lighting hub 140 uses Equations 1-12 shown above and the worst case façade angle $\phi_{F-WC}$ to calculate the optimal shade position $P_{OPT}$ that is required in order to limit the sunlight penetration distance $d_{PEN}$ to the desired maximum sunlight penetration distance $d_{MAX}$ at the variable time $t_{VAR}$. If the calculated optimal shade position $P_{OPT}$ is less than the present value of the controlled position $P_{CNTL}$ at step 1426, the lighting hub 140 sets the controlled position $P_{CNTL}$ equal to the calculated optimal shade position $P_{OPT}$ at step 1428. Otherwise, the lighting hub 140 does not adjust the present value of the controlled position $P_{CNTL}$. If the variable time $t_{VAR}$ is not equal to the interval end time $t_{INT2}$ at step 1430, the lighting hub 140 increments the variable time $t_{VAR}$ by one minute at step 1432 and the position calculation procedure 1400 to determine the worst case façade angle $\phi_{F-WC}$ and to calculate the optimal shade position $P_{OPT}$ at the new variable time $t_{VAR}$. If the variable time $t_{VAR}$ is equal to the interval end time $t_{INT2}$ at step 1430, position calculation procedure 1400 exits.

While the present invention has been described with reference to the motorized window treatments 104, the concepts of the present invention could be applied to other types of motorized window treatments, such as motorized draperies, roman shades, Venetian blinds, tensioned roller shade systems, and roller shade systems having pleated shade fabrics. An example of a motorized drapery system is described in greater detail in commonly-assigned U.S. Pat. No. 6,994,145, issued Feb. 7, 2006, entitled MOTORIZED DRAPERY PULL SYSTEM, the entire disclosure of which is hereby incorporated by reference. An example of a tensioned roller shade system is described in greater detail in commonly-assigned U.S. patent application Ser. No. 12/061,802, filed Apr. 3, 2008, entitled SELF-CONTAINED TENSIONED ROLLER SHADE SYSTEM, the entire disclosure of which is hereby incorporated by reference. An example of a roller shade system having a pleated shade fabric is described in greater detail in commonly-assigned U.S. patent application Ser. No. 12/430,458, filed Apr. 27, 2009, entitled ROLLER SHADE SYSTEM HAVING A HEMBAR FOR PLEATING A SHADE FABRIC, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of automatically controlling a position of a motorized window treatment while minimizing occupant distractions, the motorized window treatment adapted to control the amount of sunlight entering a space of a building through a window located in a façade of the building to control a sunlight penetration distance in the space, the method comprising:

building a timeclock schedule having a start time and an end time, the timeclock schedule including at least first and second consecutive timeclock events having respective first and second event times spaced apart by at least a desired minimum time period that may occur between any two consecutive timeclock events;

calculating optimal positions of the motorized window treatment at a plurality of different times between the start time and the end time that will ensure that the sunlight penetration distance will not exceed a desired maximum sunlight penetration distance at the plurality of different times between the start time and the end time;

using the optimal positions to determine, for the first timeclock event, a first event position to which the motorized window treatment will be controlled at the first event time, such that the sunlight penetration distance will not exceed the desired maximum sunlight penetration distance between the first and second event times;

using the optimal positions to determine, for the second timeclock event, a second event position to which the motorized window treatment will be controlled at the second event time; and automatically controlling the motorized window treatment according to the timeclock schedule by adjusting the position of the motorized window treatment to the first and second event positions at the first and second event times, respectively;

wherein the first and second event positions are the same position if the first and second timeclock events are located within a flat region of the optimal positions during which the optimal positions do not change in value for at least the minimum time period.

2. The method of claim 1, wherein the first event position of the first timeclock event is equal to a lowest position of the calculated optimal positions of the motorized window treatment between the first and second event times.

3. The method of claim 2, wherein if the first and second timeclock events are located within a movement region of the optimal positions of the motorized window treatment during which the optimal positions change in value, the first and second event times are spaced apart from each other by a movement time period.

4. The method of claim 3, further comprising the step of:
receiving a maximum number of movements that may occur during the timeclock schedule;
wherein a total number of timeclock events of the timeclock schedule does not exceed the maximum number of movements, and at least the minimum time period exists between the event times of any two consecutive timeclock events.

5. The method of claim 4, wherein the step of building a timeclock schedule further comprises determining whether the maximum number of movements that may occur during the timeclock schedule and the minimum time period that may occur between any two consecutive timeclock events is the limiting factor in determining the movement time period that may occur between the event times of any two consecutive timeclock events during the movement region.

6. The method of claim 2, wherein the first and second event times are spaced apart from each other by the minimum time period that may occur between any two consecutive timeclock events.

7. The method of claim 1, wherein the step of calculating optimal positions of the motorized window treatment further comprises calculating optimal positions of the motorized window treatment as a function of the longitude and latitude of the location of the building, an angle of the façade with respect to true north, a height of the window, and the present date and time.

8. The method of claim 1, wherein the first event time occurs before the second event time, and the step of controlling the motorized window treatment according to the timeclock schedule further comprises maintaining the position of the motorized window treatment at the first event position at the second event time if the first and second timeclock events are located within the flat region of the optimal positions.

9. A load control system comprising a motorized window treatment adapted to control the amount of sunlight entering a space of a building through a window located in a façade of the building to control a sunlight penetration distance in the space, the load control system comprising:

a central controller operatively coupled to the motorized window treatment, the central controller operable to transmit digital commands to the motorized window treatment, the controller further operable to
build a timeclock schedule having a start time and an end time, the timeclock schedule including at least first and second consecutive timeclock events having respective first and second event times spaced apart by at least a desired minimum time period that may occur between any two consecutive timeclock events;
calculate optimal positions of the motorized window treatment at a plurality of different times between the start time and the end time to ensure that the sunlight penetration distance will not exceed a desired maximum sunlight penetration distance at the plurality of different times between the start time and the end time;
use the optimal positions to determine, for the first timeclock event, a first event position to which the motorized window treatment will be controlled at the first event time, such that the sunlight penetration distance will not exceed the desired maximum sunlight penetration distance between the first and second event times; and automatically adjust the position of the motorized window treatment according to the timeclock schedule by adjusting the position of the motorized window treatment to the first and second event positions at the first and second event times, respectively;

wherein if the first and second timeclock events are located within a flat region of the optimal positions during which the optimal positions do not change in value for at least the minimum time period, the central controller maintains the position of the motorized window treatment at the first event position at the second event time.

10. The load control system of claim 9, wherein the first event position of the first timeclock event is equal to a lowest position of the calculated optimal positions of the motorized window treatment between the first and second event times.

11. The load control system of claim 10, wherein if the first and second timeclock events are located within a movement region of the optimal positions of the motorized window treatment during which the optimal positions change in value, the first and second event times are spaced apart from each other by a movement time period.

12. The load control system of claim 11, wherein the central controller is operable to receive a maximum number of movements that may occur during the timeclock schedule.

13. The load control system of claim 12, wherein a total number of timeclock events of the timeclock schedule does not exceed the maximum number of movements, and at least the minimum time period exists between the event times of any two consecutive timeclock events.

14. The load control system of claim 13, wherein the central controller is operable to determine whether the maximum number of movements that may occur during the timeclock schedule and the minimum time period that may occur between any two consecutive timeclock events is the limiting factor in determining the movement time period that may occur between the event times of any two consecutive timeclock events during the movement region.

15. The load control system of claim 9, further comprising:
an override wallstation comprises at least one actuator, the wallstation operable to transmit digital messages to the central controller, such that the central controller adjusts the position of the motorized window treatment in response to an actuation of the actuator.

16. The load control system of claim 15, wherein, in response to an actuation of the actuator, the central controller is operable to move the motorized window treatment to one of an open-limit position and a closed-limit position.

17. The load control system of claim 16, wherein the open-limit position comprises a visor position.

18. The load control system of claim 15, wherein the central controller is operable to disable the timeclock schedule in response to an actuation of the actuator.

19. The load control system of claim 9, wherein the central controller is operable to calculate optimal positions of the motorized window treatment as a function of the longitude and latitude of the location of the building, an angle of the façade with respect to true north, a height of the window, and the present date and time.

20. The load control system of claim 9, wherein, prior to controlling the motorized window treatment according to the timeclock schedule, the central controller is operable to use the optimal positions to determine, for the second timeclock event, a second event position to which the motorized window treatment will be controlled at the second event time, the second event position the same as the first event position if the first and second timeclock events are located within the flat region of the optimal positions.

21. A method of automatically controlling a position of a motorized window treatment while minimizing occupant distractions, the motorized window treatment adapted to control the amount of sunlight entering a space of a building through a window located in a façade of the building to control a sunlight penetration distance in the space, the method comprising:
receiving a desired maximum sunlight penetration distance for the space and a desired minimum time period that may occur between any two consecutive timeclock events;
building a timeclock schedule having a start time and an end time, the timeclock schedule including a number of timeclock events having respective event times spaced apart such that at least the minimum time period exists between the event times of any two consecutive timeclock events;
calculating optimal positions of the motorized window treatment at a plurality of different times between the start time and the end time that ensure that the sunlight penetration distance will not exceed the desired maximum sunlight penetration distance at the plurality of different times between the start time and the end time;
using the optimal positions to determine for each of the timeclock events a respective event position to which the motorized window treatment will be controlled at the respective event time, such that the sunlight penetration distance will not exceed the desired maximum sunlight penetration distance for all of the events between the start time and the end time; and
automatically controlling the motorized window treatment according to the timeclock schedule by adjusting the position of the motorized window treatment to the respective position of each of the timeclock events at the respective event time;
wherein if the optimal positions of the motorized window treatment are characterized by a flat region during which the optimal positions do not change in value for at least the minimum time period that may occur between any two consecutive timeclock events, the position of the motorized window treatment is controlled to a constant position for an amount of time greater than the minimum time period that may occur between any two consecutive timeclock events.

22. The method of claim 21, further comprising:
determining a lowest position of the calculated optimal positions of the motorized window treatment between two consecutive event times.

23. The method of claim 22, further comprising:
for the timeclock event having an event time equal to the first of the two consecutive event times, setting the event position of the timeclock event equal to the lowest position of the calculated optimal positions of the motorized window treatment between the two consecutive event times.

24. The method of claim 21, further comprising:
receiving a maximum number of movements that may occur during the timeclock schedule;
wherein the time intervals have lengths such that the number of timeclock events of the timeclock schedule does not exceed the maximum number of movements and at least the minimum time period exists between the event times of any two consecutive timeclock events.

25. The method of claim 24, wherein the step of building a timeclock schedule further comprises the steps of identifying a movement region of the optimal positions of the motorized window treatment during which the optimal positions change in value, and creating multiple timeclock events having respective event times that are spaced apart by at least the minimum time period that may occur between any two consecutive window treatment movements.

26. The method of claim 21, wherein the step of building a timeclock schedule further comprises the steps of determining if the respective event positions of two consecutive timeclock events are within a minimum position distance of each other, and eliminating the second of the two consecutive timeclock events if the event positions of the two consecutive timeclock events are within the minimum position distance of each other.

27. The method of claim 21, wherein the step of building a timeclock schedule further comprises creating multiple timeclock events between the start time and the end time of the timeclock schedule, each of the timeclock events having respective event times that are spaced apart from each other by multiples of the minimum time period that may occur between any two consecutive timeclock events.

28. The method of claim 21, wherein the step of calculating optimal positions of the motorized window treatment further comprises calculating optimal positions of the motorized window treatment as a function of the longitude and latitude of the location of the building, an angle of the façade with respect to true north, a height of the window, and the present date and time.

* * * * *